(12) United States Patent
Chan et al.

(10) Patent No.: US 11,509,482 B2
(45) Date of Patent: Nov. 22, 2022

(54) PARAMETERISABLE SMART CONTRACTS

(71) Applicant: nChain Licensing AG, Zug (CH)

(72) Inventors: Ying Chan, Cambridge (GB); Dean Kramer, London (GB)

(73) Assignee: nChain Licensing AG, Zug (CH)

( * ) Notice: Subject to any disclaimer, the term of this patent is extended or adjusted under 35 U.S.C. 154(b) by 230 days.

(21) Appl. No.: 16/616,315

(22) PCT Filed: May 14, 2018

(86) PCT No.: PCT/IB2018/053339
§ 371 (c)(1),
(2) Date: Nov. 22, 2019

(87) PCT Pub. No.: WO2018/215875
PCT Pub. Date: Nov. 29, 2018

(65) Prior Publication Data
US 2021/0184849 A1 Jun. 17, 2021

(30) Foreign Application Priority Data

May 22, 2017 (GB) .................................... 1708185
May 22, 2017 (GB) .................................... 1708190
(Continued)

(51) Int. Cl.
*H04L 29/06* (2006.01)
*H04L 9/32* (2006.01)
(Continued)

(52) U.S. Cl.
CPC ........ *H04L 9/3236* (2013.01); *G06F 16/2379* (2019.01); *G06F 21/6209* (2013.01);
(Continued)

(58) Field of Classification Search
CPC ... H04L 9/3236; H04L 9/0637; H04L 9/0643; H04L 9/30; H04L 9/3239; H04L 9/3247;
(Continued)

(56) References Cited

U.S. PATENT DOCUMENTS 10,491,402 B2   11/2019   Kaehler
2015/0081566 A1  3/2015   Slepinin
(Continued)

FOREIGN PATENT DOCUMENTS

CN   106022917 A    10/2016
WO   2017091530 A1   6/2017

OTHER PUBLICATIONS

Anonymous, "Hierarchical Deterministic Wallets—BIP32," retrieved from https://github.com/bitcoin/bips/blob/11b0fa37bee4eac40c3a1be0591078688bcc3392/bip-0032.mediawiki, Feb. 25, 2017, 9 pages.
(Continued)

*Primary Examiner* — Malcolm Cribbs
(74) *Attorney, Agent, or Firm* — Davis Wright Tremaine LLP

(57) ABSTRACT

The invention relates to distributed ledger technologies such as consensus-based blockchains. Computer-implemented methods for parameterized smart contracts are described. The invention is implemented using a blockchain network, which may be, for example, a Bitcoin blockchain. A first transaction is received at a node in a blockchain network to validate, with the first transaction including a first script that, as a result of being executed, causes the node to at least obtain data and a first set of field values of the first transaction. A second transaction is obtained, with the second transaction including a second script that, as a result of being executed, causes the node to at least determine, based at least in part on the data supplied as a result of execution
(Continued)

of the first script, a set of constraints, and verify, based at least in part on the first set of field values, that the set of constraints are applicable to the first transaction. The first transaction is validated according to the set of constraints as a result of execution of the first script and the second script.

15 Claims, 26 Drawing Sheets

(30) Foreign Application Priority Data

| | | | |
|---|---|---|---|
| May 22, 2017 | (GB) | ...................................... | 1708192 |
| May 22, 2017 | (GB) | ...................................... | 1708196 |
| May 22, 2017 | (GB) | ...................................... | 1708198 |
| May 22, 2017 | (GB) | ...................................... | 1708200 |

(51) Int. Cl.

| | |
|---|---|
| G06Q 20/06 | (2012.01) |
| G06Q 20/36 | (2012.01) |
| G06Q 20/38 | (2012.01) |
| H04L 9/06 | (2006.01) |
| G06F 16/23 | (2019.01) |
| H04L 9/30 | (2006.01) |
| G06F 21/64 | (2013.01) |
| G06F 21/62 | (2013.01) |
| G06Q 10/10 | (2012.01) |
| H04L 9/00 | (2022.01) |

(52) U.S. Cl.
CPC ......... *G06F 21/645* (2013.01); *G06Q 20/065* (2013.01); *G06Q 20/0658* (2013.01); *G06Q 20/36* (2013.01); *G06Q 20/3674* (2013.01); *G06Q 20/389* (2013.01); *G06Q 20/3825* (2013.01); *G06Q 20/3829* (2013.01); *H04L 9/0637* (2013.01); *H04L 9/0643* (2013.01); *H04L 9/30* (2013.01); *H04L 9/3239* (2013.01); *H04L 9/3247* (2013.01); *G06Q 10/10* (2013.01); *G06Q 2220/00* (2013.01); *H04L 9/3066* (2013.01); *H04L 9/3252* (2013.01); *H04L 9/50* (2022.05); *H04L 2209/56* (2013.01)

(58) Field of Classification Search
CPC . H04L 9/3066; H04L 9/3252; H04L 2209/38; H04L 2209/56; G06F 16/2379; G06F 21/6209; G06F 21/645; G06Q 20/065; G06Q 20/0658; G06Q 20/36; G06Q 20/3674; G06Q 20/3825; G06Q 20/3829; G06Q 20/389; G06Q 10/10; G06Q 2220/00
See application file for complete search history.

(56) References Cited

U.S. PATENT DOCUMENTS

| | | | |
|---|---|---|---|
| 2016/0253663 | A1 | 9/2016 | Clark et al. |
| 2016/0344550 | A1 | 11/2016 | Anton et al. |
| 2017/0091750 | A1 | 3/2017 | Maim |
| 2017/0149819 | A1* | 5/2017 | Androulaki ......... H04L 63/0823 |
| 2017/0187535 | A1 | 6/2017 | Middleton et al. |
| 2017/0230189 | A1* | 8/2017 | Toll ........................ G06Q 40/04 |
| 2017/0236121 | A1* | 8/2017 | Lyons .................... G06Q 20/06 705/71 |
| 2017/0301047 | A1 | 10/2017 | Brown et al. |
| 2017/0337534 | A1* | 11/2017 | Goeringer ........... H04L 63/0428 |
| 2018/0253702 | A1 | 9/2018 | Dowding |
| 2018/0285838 | A1* | 10/2018 | Franaszek ............ H04L 9/3247 |
| 2018/0285996 | A1 | 10/2018 | Ma |
| 2019/0043048 | A1 | 2/2019 | Wright et al. |
| 2019/0050832 | A1 | 2/2019 | Wright et al. |
| 2019/0058592 | A1 | 2/2019 | Wright et al. |
| 2019/0149337 | A1 | 5/2019 | Savanah et al. |
| 2019/0228391 | A1 | 7/2019 | Hu et al. |
| 2020/0082361 | A1* | 3/2020 | Chan ..................... H04L 9/3247 |
| 2021/0090037 | A1 | 3/2021 | Dowding |
| 2021/0182433 | A1 | 6/2021 | Yan et al. |

OTHER PUBLICATIONS

Antonopoulos, "Bitcoin Book," GitHub, retrieved from https://github.com/bitcoinbook/bitcoinbook, Feb. 2, 2018, 4 pages.
Antonopoulos, "Mastering Bitcoin—Unlocking Digital Cryptocurrencies," O'Reilly Media, Inc., Dec. 20, 2014, 282 pages.
Armknecht et al., "Ripple: Overview and Outlook," retrieved from https://www.researchgate.net/profile/Avikarsha_Mandal/publication/281631024_Ripple_Overview_and_Outlook/links/55f1434c08aef559dc4700f4/Ripple-Overview-and-Outlook.pdf, Aug. 2015, 19 pages.
Bissias et al., "Sybil-Resistant Mixing for Bitcoin," Proceedings of the 13th Workshop on Privacy in the Electronic Society, Nov. 3, 2014, http://forensics.umass.edu/pubs/bissias.wpes.2014.pdf, 10 pages.
Bitcoin Stack Exchange, "Custom Validation Logic for Transactions/Custom Script Extensions," retrieved from https://bitcoin.stackexchange.com/questions/4125/custom-validation-logic-for-transactions-custom-script-extensions, 2013, 3 pages.
Bitfury Group, "Digital Assets on Public Blockchains," White Paper, BitFury Group Limited, Mar. 15, 2016, http://bitfury.com/content/5-white-papers-research/bitfury-digital_assets_on_public_blockchains-1.pdf, 37 pages.
Bitfury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
Coleman, "Bitcoin/Bips," retrieved from https://github.com/bitcoin/bips/blob/11b0fa37bee4eac40c3a1be0591078688bcc3392/bip-0032.mediawiki, GitHub, Feb. 24, 2017, 15 pages.
Deathandtaxes, "Using a DHT to Reduce the Resource Requirements of Full Nodes," retrieved from https://bitcointalk org/index.php?topic=662734.0, Jun. 23, 2014, 11 pages.
Eragmus, "Dr. Craig Wright (alleged Satoshi, by Wired) on YouTube, From Bitcoin Investor Conference at Las Vegas," retrieved from https://www.reddit.com/r/Bitcoin/comments/3w027x/dr_craig_steven_, Jun. 22, 2017, 24 pages.
Fangolo et al., "Sergio Lerner: I Think I Will Start Working On a New Soft-Fork For Bitcoin to Add Turing—Complete Scripting, Called Bit2. CLTV/CSTV Made With Std Opcodes," retrieved from https://www.reddit.eom/r/ethereum/comments/468hdc/sergio_lerner_i_think_i_will_start_working_on_a/, Feb. 17, 2016, 7 pages.
Greatwolf, "What Happens if Everyone Prunes Blocks?" retrieved from https://www.reddit.com/r/Bitcoin/comments/3det7n/what_happens_if_everyone_prunes_bloc ks/, Jul. 15, 2015, 7 pages.
Heilman et al., "TumbleBit: An Untrusted Tumbler for Bitcoin—Compatible Anonymous Payments," International Association for Cryptologic Research, Jun. 3, 2016, 14 pages.
International Search Report and Written Opinion for Application No. PCT/IB2018/053335, dated Aug. 1, 2018, filed May 14, 2018, 11 pages.
International Search Report and Written Opinion for Application No. PCT/IB2018/053338, dated Aug. 1, 2018, filed May 14, 2018, 11 pages.
International Search Report and Written Opinion for Application No. PCT/IB2018/053339, dated Jul. 20, 2018, filed May 14, 2018, 11 pages.
International Search Report and Written Opinion dated Aug. 1, 2018, International Patent Application No. PCT/IB2018/053337, filed May 14, 2018, 11 pages.
International Search Report and Written Opinion dated Jul. 23, 2018, International Patent Application No. PCT/IB2018/053336, filed May 14, 2018, 12 pages.
International Search Report and Written Opinion dated Jul. 23, 2018, International Patent Application No. PCT/IB2018/053340, filed May 14, 2018, 12 pages.

(56) References Cited

OTHER PUBLICATIONS

Jesionek et al., "BIP0032: Hierarchical Deterministic Wallets," GitHub, https://github.com/bitcoin/bips/blob/master/bip-0032.mediawiki, Jan. 2014, 9 pages.
Kaminsky, "I Tried to Hack Bitcoin and Failed," retrieved from https://www.reddit.com/r/Bitcoin/comments/1c7lzi/i_tried_to_hack_bitcoin_and_failed_dan_kaminsky/aminsky/, Sep. 9, 2010, 24 pages.
Lerner, "Ethereum Comments," retrieved from https://www.reddit.com/r/ethereum/comments/468hdc/sergio_lerner_i_think_i_will_start_working_on_a/, Feb. 16, 2016, 7 pages.
Nakamoto, "Bitcoin: A Peer-to-Peer Electronic Cash System," Bitcoin, Oct. 31, 2008, https://bitcoin.org/bitcoin.pdf, 9 pages.
Okupski, "Bitcoin Developer Reference," retrieved from https://lopp.net/pdf/Bitcoin_Developer_Reference.pdf, Jul. 30, 2016, 43 pages.
Pair et al., "Re: [Bitcoin-development] Blocking Uneconomical UTXO Creation," email thread, retrieved from https://www.mail-archive.com/search?l=bitcoin-development@lists.sourceforge.net&q=subject:%22\[Bitcoin\-development\]+Blocking+uneconomical+UTXO+creation%22&o=newest&f=1, Mar. 12, 2013, 10 pages.
Piachu, "Custom Validation Logic for Transactions/Custom Script Extensions," retrieved from https://bitcoin.stackexchange.com/questions/4125/custom-validation-logic-for-transactions-custom-script-extensions, Sep. 8, 2017, 5 pages.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Priest, Op_CheckWildCardSigverify or "Wildcard Inputs" or "Coalescing Transactions," retrieved from <http://www.reddit.com/r/bitcoindevlist/comments/3vzm2i/op_checkwidcardsigverify_orwid>_checkwildcard inputs or/ Nov. 24, 2015, 52 pages.
Ruffing et al., "P2P Mixing and Unlinkable Bitcoin Transactions," International Association for Cryptologic Research, Aug. 24, 2016, 15 pages.
Satoshi et al., "Connection Limits," Bitcoin Forum, Aug. 9, 2010, https://bitcointalk.org/index.php?topic=741.0;prev_next=prev, 2 pages.
Selij et al., "CoinShuffle Anonymity in the Block Chain," retrieved from http://delaat.net/rp/2014-2015/p77/report.pdf, Jul. 20, 2015, 36 pages.
Smart Contracts, "Smart Contracts/EVM FAQ," retrieved from https://web.archive.org/web/20170719092538/nttps://counterparty.io/docs/faq-smartcontracts/, Jul. 19, 2017, 7 pages.
Todd, "Building Blocks of the State Machine Approach to Consensus," petertodd.org, Jun. 20, 2016 [retrieved Feb. 5, 2018], https://petertodd.org/2016/state-machine-consensus-building-blocks, 15 pages.
UK Commercial Search Report dated Aug. 9, 2017, Patent Application No. GB1708185.2, 5 pages.
UK Commercial Search Report dated Aug. 9, 2017, Patent Application No. GB1708192.8, 5 pages.
UK Commercial Search Report dated Aug. 9, 2017, Patent Application No. GB1708196.9, 5 pages.
UK Commercial Search Report dated Aug. 9, 2017, Patent Application No. GB1708198.5, 5 pages.
UK Commercial Search Report dated Aug. 9, 2017, Patent Application No. GB1708200.9, 5 pages.
UK Commercial Search Report dated Aug. 9, 2017, Patent Application No. GB1708190.2, 5 pages.
UK IPO Search Report dated Nov. 14, 2017, Patent Application No. GB1708185.2, 7 pages.
UK IPO Search Report dated Nov. 14, 2017, Patent Application No. GB1708190.2, 7 pages.
UK IPO Search Report dated Nov. 14, 2017, Patent Application No. GB1708192.8, 8 pages.
UK IPO Search Report dated Nov. 14, 2017, Patent Application No. GB1708196.9, 7 pages.
UK IPO Search Report dated Nov. 14, 2017, Patent Application No. GB1708198.5, 7 pages.
UK IPO Search Report dated Nov. 14, 2017, Patent Application No. GB1708200.9, 7 pages.
Wikipedia, "Atomic Swap," retrieved from https://en.bitcoin.it/wiki/Atomic_swap, Dec. 2018, 3 pages.
Wilkinson, "Introduction to Micropayment Channels," retrieved from http://super3.org/introduction-to-micropayment-channels/, Apr. 13, 2016, 4 pages.
Wright, "Reddit/Ethereum Forum," retrieved from http://www.reddit.com/r/Bitcoin/comments/3w027x/drcraig_stevenwrightallegedsatoshi>by_wired/, Dec. 8, 2015, 24 pages.

\* cited by examiner

PARAMETERISABLE SMART CONTRACTS

This invention relates generally to distributed ledger technologies, including blockchain transactions, and more particularly to causing the injection of fields from blockchain transactions into the unlocking transaction scripts. The invention utilises cryptographic and mathematical techniques to enforce security in relation to electronic transfers conducted over a blockchain network. The invention is particularly suited for, but not limited to, use in smart contracts and state machines.

In this document we use the term "blockchain" to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While "Bitcoin" may be referred to as a useful application of the technology described in the present disclosure, for the purpose of convenience and illustration, Bitcoin is just one of many applications to which the technology described in the present disclosure may be applied. However, it should be noted that the invention is not limited to use with the Bitcoin blockchain; alternative blockchain implementations and protocols, including non-commercial applications, also fall within the scope of the present invention. For example, techniques would provide advantages to utilising blockchain implementations that have limitations similar to Bitcoin regarding what constraints can be encoded within transactions, regardless whether an exchange of cryptocurrency occurs.

A blockchain is a peer-to-peer, electronic ledger which is implemented as a computer-based decentralised, distributed system made up of blocks which in turn are made up of transactions and other information. In some examples, a "blockchain transaction" refers to an input message encoding a structured collection of field values comprising data and a set of conditions, fulfilment of the set of conditions being prerequisite for the set of fields to be written to a blockchain data structure. For example, with Bitcoin, each transaction is a data structure that encodes the transfer of control of a digital asset between participants in the blockchain system, and includes at least one input and at least one output. In some implementations, transferring control of a digital asset can be performed by reassociating at least a portion of a digital asset from a first entity to a second entity. Each block contains a hash of the previous block so that blocks become chained together to create a permanent, immutable record of all transactions which have been written to the blockchain since its inception. Transactions contain small programs known as scripts embedded into their inputs and outputs that specify how and by whom the outputs of the transactions can be accessed. On the Bitcoin platform, these scripts are written using a stack-based scripting language.

That is, the stack-based scripting language may utilize a stack. With the stack, values can be pushed onto the top of the stack or popped from the top of the stack. Various operations performed to the stack can result in pushing or popping one or more of the values to or from the top of the stack. For example, an OP_EQUAL operation pops the top two items from the stack, compares them, and pushes a result (e.g., 1 if equal or 0 if unequal) to the top of the stack. Other operations performed to the stack, such as OP_PICK, may allow items to be selected from positions other than the top of the stack. In some scripting languages employed by some of the present embodiments, there may be at least two stacks: a main stack and an alternate stack. Some operations of the scripting language can move items from the top of one stack to the top of another stack. For example, OP_TOALTSTACK, moves a value from the top of the main stack to the top of the alternate stack.

In order for a transaction to be written to the blockchain, it must be "validated". Network nodes (miners) perform work to ensure that each transaction is valid, with invalid transactions rejected from the network. A node can have standards for validity different from other nodes. Because validity in the blockchain is consensus based, a transaction is considered valid if a majority of nodes agree that a transaction is valid. Software clients installed on the nodes perform this validation work on transactions referencing an unspent transaction (UTXO) in part by executing the UTXO locking and unlocking scripts. If execution of the locking and unlocking scripts evaluates to TRUE and other validation conditions, if applicable, are met, the transaction is valid by the node. The validated transaction is propagated to other network nodes, whereupon a miner node can select to include the transaction in a blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e., added to the public ledger of past transactions. The transaction is considered to be confirmed when a sufficient number of blocks are added to the blockchain to make the transaction practically irreversible.

The present disclosure describes technical aspects of one or more blockchain-based computer programs. A blockchain-based computer program is a machine readable and executable program recorded in a blockchain transaction. The blockchain-based computer program comprises rules that can process inputs in order to produce results, which can then cause actions to be performed dependent upon those results. If a locking script can access both the unlocking and previous transactions, the blockchain can be utilized to enable highly flexible and complex smart contracts. One area of current research is the use of blockchain-based computer programs for the implementation of "smart contracts". Unlike a traditional contract which would be written in natural language, smart contracts may be computer programs designed to automate the execution of the terms of a machine-readable contract or agreement.

In embodiments, although interaction with specific entities can be encoded at specific steps in the smart contract, the smart contract can otherwise be automatically executed and self-enforced. In some examples, automatic execution refers to the execution of the smart contract that is successfully performed to enable transfer of the UTXO. Note that, in such examples, an "entity" that is able to cause the transfer of the UTXO refers to an entity that is able to create the unlocking script without being required to prove knowledge of some secret. In other words, the unlocking transaction can be validated without verifying that the source of the data (e.g., entity that created the unlocking transaction) has access to a cryptographic secret (e.g., private asymmetric key, symmetric key, etc.). Also, in such examples, self-enforcement refers to the validation nodes of the blockchain network being caused to enforce the unlocking transaction according to the constraints. In some examples, "unlocking" a UTXO (also known as "spending" the UTXO) is used in the technical sense, referring to creating an unlocking transaction that references the UTXO and executes as valid.

A blockchain transaction output includes a locking script and information regarding ownership of digital assets such as Bitcoins. The locking script, which may also be referred to as an encumbrance, "locks" the digital assets by specifying conditions that are required to be met in order to transfer the UTXO. For example, a locking script could require that certain data be provided in an unlocking script to unlock the associated digital assets. The locking script is also known as "scriptPubKey" in Bitcoin. A technique for requiring a party to provide data to unlock a digital asset involves embedding a hash of the data inside the locking script. However, this presents a problem if the data is undetermined (e.g., not known and fixed) at the time the locking script is created.

Thus, it is desirable to provide for improved methods and systems that improve blockchain technology in one or more of these aspects. Thus, in accordance with the present invention, there is provided a method and corresponding system as defined in the appended claims.

The invention may be described as a verification method/system, and/or as a control method/system for controlling the validation of blockchain transactions. In some embodiments, a validated blockchain transactions results in recordation of the transaction on a blockchain, which in some applications, may result in an exchange or transfer of a digital asset via the blockchain. The digital asset is a unit of a resource managed by a blockchain. Although the digital asset may, in some embodiments, be used as cryptocurrency, it is contemplated that the digital asset, in embodiments, is additionally or alternatively usable in other contexts. Note that the invention, while applicable to the control of digital assets, is technical in nature and can be used in other contexts that utilise blockchain data structures without necessarily involving the transfer of digital assets. As explained below, the invention may also be described as a security method/system for new, improved and advantageous ways of performing operations via a blockchain network or platform.

As will be described in greater detail below, in an embodiment, a locking script may be given access to certain fields of an unlocking transaction by taking as input a set of field values of the unlocking transaction and a signature hash (SIGHASH) type from an unlocking script of the unlocking transaction and performing signature generation and verification operations.

As will be described in greater detail below, in an embodiment, a locking script may be given access to a set of fields in a previous transaction by constraining a transaction identifier (ID), extracted from the certain fields of the unlocking transaction, such that a serialized previous transaction is included in the unlocking script of the unlocking transaction. In accordance with the embodiment, there may be provided a method to inject a serialized previous transaction in a blockchain transaction locking script by taking as input a first set of field values corresponding to a first transaction and a second set of field values corresponding to another transaction, extracting a transaction identifier from the first set of field values, and determining based on the second set of field values that the other transaction corresponds to the transaction identifier As will be described in greater detail below, in an embodiment, locking and unlocking scripts may be configured to enable secure provision of undetermined data from either a determined or undetermined source. To make data from an undetermined source secure from alteration, the data can be embedded in a serialized previous transaction. Note that even though the data is in the serialized previous transaction, it is considered undetermined in the sense that the locking script does not constrain the data to be a certain value. To make data from a determined source secure from alteration, a public key from the determined source can be included in the locking script where the data can be used to modify the public key, which can then be used to validate a signature of the data signed using a modified private key. In accordance with the embodiment, there may be provided a method to obtain undetermined data and a second value, and validating that the undetermined data is associated with a data source based on the data and the second value provided in an unlocking script.

As will be described in greater detail below, in an embodiment a parameterized smart contract may be created by extracting constraint parameters from a previous transaction and applying the constraint parameters to fields of the unlocking transaction. The parameterized smart contract can be realized through a locking script having constraints that are parameterized by secure, undetermined data provided in an unlocking script of an unlocking transaction from a determined or undetermined source. In accordance with the embodiment, there may be provided a method to obtain undetermined data from which a set of constraints to apply to reassociation of a digital asset can be determined and reassociating the digital assets with a second entity according to the set of constraints.

As will be described in greater detail below, in an embodiment, the smart contract is created to be self-replicating until a termination condition is reached. In accordance with the embodiment, there may be provided a method to check for fulfilment of a termination condition and, if the termination condition is unfulfilled, check that a locking script of a previous transaction matches a locking script of the unlocking transaction.

As will be described in greater detail below, in an embodiment, the parameterized, self-replicating smart contract may be used to create a trustless, deterministic state machine. In accordance with the embodiment, there may be provided a method to verify a self-replicating locking script and, based at least in part on input from a determined source and a current state of a trustless, deterministic state machine, determine a next state for the trustless, deterministic state machine.

The novel techniques described and suggested in the present disclosure extend the functionality of the blockchain without disrupting the properties of the blockchain that ensure the integrity of the data stored within the blockchain data structure. For example, the techniques improve the field of computing, specifically the field of digital record validation where conditions for validation are defined smart contracts embedded in the records, by utilizing a blockchain network to set and enforce criteria for reassociating digital assets. Additionally, techniques described and suggested in the present disclosure may improve the functionality of blockchain networks by enabling blockchain transactions to function as state machines to enable computer program functionality to be dependent upon states recorded in such state machines.

Moreover, techniques described and suggested in the present disclosure may be necessarily rooted in computer technology in order to overcome problems specifically arising with blockchain technologies (such as Bitcoin's Script) which have been specifically designed to restrict functionality for security reasons. For example, Script does not natively support complex flow control functionality, for example, loops to occur. One advantage of this restriction is that the programs have predictable execution times. Another significant advantage of limiting scripts to linear or tree-like decision tasks is that this avoids infinite loops, which can be used as a means of launching exploits such as a denial of service (DoS or DDoS) attack. Thus, the security of blockchain transfer/exchange is enhanced and preserved but mechanisms need to be found to implement the functionality that is not permitted or provided by the language itself. The present invention provides an advance in this respect, addressing the current limitations of blockchain transactions at least in part, with an implementation of self-replicating and self-referencing blockchain transaction locking scripts. Thus, the invention provides a technical solution to a technical problem, and offers advantages in respect of security, improved control of digital assets exchange/transfer via a blockchain, and an extension of current blockchain-related functionality.

Therefore, in accordance with the invention there may be provided a computer-implemented method (and corresponding system(s)) as defined in the appended claims. The computer-implemented method may be described as a blockchain data constraint method. The computer-implemented method may include: i) receiving, at a node in a blockchain network, a first transaction to transfer control of a digital asset, the first transaction including a first script that at least: includes a set of field values of the first transaction; and as a result of being executed, causes the node to obtain the set of field values; ii) obtaining a second transaction, the second transaction being associated with the digital asset and including a second script that, as a result of being executed, causes the node to at least generate a signature based at least in part on the set of field values supplied as a result of execution of the first script; and iii) validating the first transaction by executing the first script and the second script.

Validating the first transaction may be successfully performed without verifying that an entity that created the first transaction has access to secret information.

The first script may further include a private cryptographic key of an asymmetric key pair. Additionally or alternatively, the second script may further cause the node to generate the signature based at least in part on the private cryptographic key and a mask number. Additionally or alternatively, validating the first transaction may further include validating that the signature is associated with a public cryptographic key of the asymmetric key pair.

The first script may further specify a signature hash type. Additionally or alternatively, the set of field values may be based at least in part on the signature hash type.

The signature hash type may be a value that indicates which field values of the set of field values of the first transaction are to be included in the signature.

The second script may be a locking script that imposes a set of conditions for validating the first transaction. Additionally or alternatively, execution of the locking script may cause the node to validate the first transaction by determining whether the set of conditions have been fulfilled.

The first script may be an unlocking script for satisfying the set of conditions of the second script.

The digital asset may be associated with an unspent transaction output in the blockchain network.

The node may be a computing device that is communicatively coupled to at least one other node in the blockchain network.

The blockchain network may be comprised of distributed electronic devices running an instance of a blockchain protocol.

The first script and second script may be written using a Turing incomplete instruction set.

The first script and second script are written using a Turing complete instruction set.

The first script, by including the set of fields, may cause the node, as a result of execution of the first script, to make the set of fields available as input to the second script.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

Therefore, in accordance with the invention there may be provided a computer-implemented method (and corresponding system(s)) as defined in the appended claims. The computer-implemented method may be described as a blockchain data constraint method. The computer-implemented method may include: i) receiving, at a node in a blockchain network, a first transaction to transfer control of a digital asset, the first transaction including a first script that, as a result of being executed, causes the node to at least: obtain a first set of field values corresponding to the first transaction; and obtain a second set of field values corresponding to a particular transaction; ii) obtaining a second transaction, the second transaction being associated with the digital asset and including a second script that, as a result of being executed, causes the node to at least: obtain the first set of field values and the second set of field values of the particular transaction supplied as a result of execution of the first script; extract a transaction identifier from the first set of field values; and determine, based at least in part on the second set of field values, that the particular transaction corresponds to the transaction identifier; and iii) validating the first transaction by executing the first script and the second script.

The second set of field values may be in a canonicalized format.

The node may determine that the particular transaction corresponds to the transaction identifier by generating a hash of the second set of field values. Additionally or alternatively, the node may determine that the particular transaction corresponds to the transaction identifier by verifying that the hash matches the transaction identifier.

The particular transaction may be associated with the control of the digital asset being transferred.

The particular transaction may be associated with a second digital asset different from the digital asset being transferred.

Validating the first transaction may succeed without verifying that an entity that created the first transaction has access to secret information.

The node may be a validation node of the blockchain network.

Validating the first transaction may further include, as a result of successful validation of the first transaction, adding the first transaction to a blockchain in the blockchain network.

The second script may be a locking script that imposes a set of conditions for validating the first transaction. Additionally or alternatively, execution of the locking script may cause the node to validate the first transaction by determining whether the set of conditions have been fulfilled.

The first script may be an unlocking script for satisfying the set of conditions of the second script.

The first script may specify a signature hash type. Additionally or alternatively, the second script, further as a result of being executed, may cause the node to obtain the signature hash type supplied as a result of execution of the first script.

The second script, may further as a result of being executed, cause the node to determine, based at least in part on the signature hash type, that the particular transaction is a member of a set of transactions associated with the first transaction.

The second script, further as a result of being executed, may cause the node to determine, based at least in part on the signature hash type, that the particular transaction corresponds to the second transaction.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

Therefore, in accordance with the invention there may be provided a computer-implemented method (and corresponding system(s)) as defined in the appended claims.

The computer-implemented method may be described as a blockchain data constraint method. The computer-implemented method may include: i) receiving, at a node in a blockchain network, a first transaction to transfer control of a digital asset, the first transaction including a first script that includes at least: a first value, at least a portion of the first value including data that is unconstrained by a second script; and a second value; ii) obtaining a second transaction, the second transaction being associated with the digital asset and including the second script that, as a result of being executed, causes the node to at least: obtain the first value and the second value as a result of execution of the first script; and validate, based at least in part on first value and the second value, that the data is associated with a particular source; and iii) validating the first transaction by executing the first script and the second script.

The second script may be a locking script that includes a set of conditions for validating the second transaction. Additionally or alternatively, the first script may be an unlocking script of for satisfying the set of conditions of the locking script.

Validating the first transaction may be performed without verifying that an entity that created the first transaction has access to secret information.

Unsuccessful validation that the data is associated with the data source may cause validating the first transaction to be unsuccessful.

An identity of the particular source may be unconstrained by the second script.

A particular transaction may be the particular source of the data. Additionally or alternatively, the first value may be a set of field values of the particular transaction. Additionally or alternatively, the second value may include a transaction identifier associated with the particular transaction. The second script may validate that the data is associated with the data source by validating that the particular transaction corresponds to the transaction identifier.

The second script may validate that the particular transaction corresponds to the transaction identifier by validating that the transaction identifier matches a hash of the set of fields of the particular transaction.

The first script, by including the set of fields of the particular transaction, may cause the node, as a result of execution of the first script, to make the set of fields of the particular transaction available as input to the second script.

The particular transaction may be the second transaction.

The data may be encoded in a field of the particular transaction.

The second script may constrain an identity of the particular source.

The second value may be a signature. Additionally or alternatively, the second script may further cause the node to obtain a public key associated with the data source and, additionally or alternatively, generate, based at least in part on the public key and the data, a modified public key. Additionally or alternatively, the second script may validate that the data is associated with the data source based at least in part on the modified public key.

The modified public key may be generated by performing elliptic curve point multiplication on the public key by a value of the data.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed. Therefore, in accordance with the invention there may be provided a computer-implemented method (and corresponding system(s)) as defined in the appended claims. The computer-implemented method may be described as a blockchain data constraint method. The computer-implemented method may include: i) receiving, at a node in a blockchain network, a first transaction to transfer control of a digital asset, the first transaction including a first script that, as a result of being executed, causes the node to at least obtain data and a first set of field values of the first transaction; ii) obtaining a second transaction, the second transaction including a second script that, as a result of being executed, causes the node to at least: determine, based at least in part on the data supplied as a result of execution of the first script, a set of constraints; and verify, based at least in part on the first set of field values, the set of constraints against the first transaction; and iii) transferring control of the digital asset according to the set of constraints as a result of execution of the first script and the second script.

Transferring control of the digital asset may be performed without verifying that an entity that created the first transaction has access to secret information.

An identity of a source of the data may be unconstrained by the second script.

The second script may constrain an identity of a source of the data.

The second script may include a public key of a particular data source usable to validate the data.

Validating the data may include generating, based at least in part on the public key and the data, a modified public key and, additionally or alternatively, determining that the data is associated with a data source based at least in part on the modified public key.

The set of constraints may be derived at least in part from a set of parameters in the data.

Fulfilment of the set of constraints may be a condition for reassociating of at least the portion of the digital asset.

Transferring control of the digital asset may include reassociating the digital asset from a first entity to a second entity.

An identity of the second entity may be determined based at least in part on the set of constraints.

A source of the data may be the second transaction. Additionally or alternatively, the data includes a second set of field values of the second transaction. Additionally or alternatively, execution of the second script may cause the set of constraints to be derived at least in part from the second set of field values.

An identity of the second entity may be determined based at least in part on the set of constraints.

The set of constraints may further cause at least a portion of the digital asset to be reassociated with a third entity.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

Therefore, in accordance with the invention there may be provided a computer-implemented method (and corresponding system(s)) as defined in the appended claims. The computer-implemented method may be described as a blockchain data constraint method. The computer-implemented method may include: i) receiving, at a node in a blockchain network, a first transaction to transfer control of a digital asset, the first transaction including a first script that, as a result of being executed, causes the node to at least: obtain a first set of field values of the first transaction, the first set of field values including a third script; and obtain a second set of field values of a second transaction, the second set of field values including a copy of the second script; ii) obtaining the second transaction, the second transaction including a second script that, as a result of being executed, causes the node to, as a result of determining that a termination condition is unfulfilled, at least: obtain the third script from the first set of field values; and determine that the copy of the second script matches the third script; and iii) transferring control of the digital asset as a result of execution of the first script and the second script.

The second transaction may be a transaction associated with the digital asset. Additionally or alternatively, the first transaction may be a transaction is a transaction to reassociate at least the portion of the digital asset from a first entity to a second entity.

The first script may be an unlocking script for satisfying a set of conditions of the second script.

The second script may a locking script that imposes the set of conditions for validating the first transaction.

The third script may be a locking script that imposes the set of conditions for validation of a future transaction.

Transferring control of the digital asset may include reassociating the digital asset from a first entity to a second entity.

Determining that a termination condition is unfulfilled may include determining that an amount of the digital asset associated with the second transaction is sufficient to reassociate at least the portion of the digital asset.

The third script may be embedded in a field value of the first set of field values.

The blockchain network may be comprised of distributed electronic devices running an instance of a blockchain protocol.

Transferring control of the digital asset may be performed without verifying that an entity that created the first transaction has access to a secret information.

The second script may further cause the node to verify, as a further condition for transferring control of the digital asset, that the first transaction meets an additional constraint.

The first and second transactions may be members of a set of repeating smart contracts associated with the digital asset.

The set of repeating smart contracts may be terminated by the termination condition.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

Therefore, in accordance with the invention there may be provided a computer-implemented method (and corresponding system(s)) as defined in the appended claims. The computer-implemented method may be described as a blockchain data constraint method. The computer-implemented method may include: A computer-implemented method, comprising: i) receiving, at a node in a blockchain network, a first transaction to transfer control of a digital asset, the first transaction including a first script that, as a result of being executed, causes the node to at least obtain a first set of field values of the first transaction, a second set of field values of a second transaction, and an input; ii) obtaining the second transaction, the second transaction including a second script that includes a set of rules, the second script, as a result of being executed, causing the node to at least: verify that the second script matches a third script embedded in the first set of field values; determine, based at least in part on the second set of field values, a current state; and determine, based at least in part on the current state, the input, and the set of rules, a next state; verify that the next state is included in the first set of field values; and iii) transferring control of the digital asset as a result of execution of the first script and the second script.

The second script may constrain an identity of a source of the input.

Any of the methods as claimed may further comprise verifying a cryptographic secret of a source of the input.

The set of rules may be a state-transition matrix.

The third script may be a locking script that imposes a set of conditions for validation of a future transaction.

The second script may further cause the node to determine that a termination condition is unfulfilled.

The input may be embedded in the second set of field values.

The termination condition may be that the digital asset associated with the second transaction is of insufficient size to be transferred.

The current state may indicate a state of the second transaction.

The next state may indicate a state of the first transaction upon validation.

Any of the methods as claimed may further comprise receiving a third transaction. Additionally or alternatively, any of the methods as claimed may further comprise obtaining a fourth script from the first transaction, the fourth script, as a result of being executed, causing the node to determine, based at least in part on the next state, a second input, and the set of rules, another state different from the next state and the current state.

The current state and the next state may be members of a set of possible states for the first and second transactions.

Transferring control of the digital asset may include reassociating the digital asset from a first entity to a second entity.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

Therefore, in accordance with the invention there may be provided a method (and corresponding system(s)) as defined in the appended claims. The method may be described as a blockchain data constraint method. The method may include: i) receiving, at a node in a blockchain network, a first transaction to validate, the first transaction including a first script that at least: includes a set of field values of the first transaction; and as a result of being executed, causes the node to obtain the set of field values; ii) obtaining a second transaction, the second transaction having been validated and including a second script that, as a result of being executed, causes the node to at least generate a signature based at least in part on the set of field values supplied as a result of execution of the first script; and iii) validating the first transaction by executing the first script and the second script.

Validating the first transaction may be successfully performed without verifying that an entity that created the first transaction has access to secret information.

The first script may further include a private cryptographic key of an asymmetric key pair. Additionally or alternatively, the second script may further cause the node to generate the signature based at least in part on the private cryptographic key and a mask number. Additionally or alternatively, validating the first transaction may further include validating that the signature is associated with a public cryptographic key of the asymmetric key pair.

The first script may further specify a signature hash type. Additionally or alternatively, the set of field values may be based at least in part on the signature hash type.

The signature hash type may be a value that indicates which field values of the set of field values of the first transaction are to be included in the signature.

The second script may be a locking script that imposes a set of conditions for validating the first transaction. Additionally or alternatively, execution of the locking script may cause the node to validate the first transaction by determining whether the set of conditions have been fulfilled.

The first script may be an unlocking script for satisfying the set of conditions of the second script.

Validating the first transaction may cause the transfer of an unspent transaction output.

The node may be a computing device that is communicatively coupled to at least one other node in the blockchain network.

The blockchain network may be comprised of distributed electronic devices running an instance of a blockchain protocol.

The first script and second script may be written using a Turing incomplete instruction set.

The first script and second script are written using a Turing complete instruction set.

The first script, by including the set of fields, may cause the node, as a result of execution of the first script, to make the set of fields available as input to the second script.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

Therefore, in accordance with the invention there may be provided a method (and corresponding system(s)) as defined in the appended claims. The method may be described as a blockchain data constraint method. The method may include: i) receiving, at a node in a blockchain network, a first transaction to validate, the first transaction including a first script that, as a result of being executed, causes the node to at least: obtain a first set of field values corresponding to the first transaction; and obtain a second set of field values corresponding to a particular transaction; ii) obtaining a second transaction, the second transaction having been validated and including a second script that, as a result of being executed, causes the node to at least: obtain the first set of field values and the second set of field values of the particular transaction supplied as a result of execution of the first script; extract a transaction identifier from the first set of field values; and determine, based at least in part on the second set of field values, that the particular transaction corresponds to the transaction identifier; and iii) validating the first transaction by executing the first script and the second script.

The second set of field values may be in a canonicalized format.

The node may determine that the particular transaction corresponds to the transaction identifier by generating a hash of the second set of field values. Additionally or alternatively, the node may determine that the particular transaction corresponds to the transaction identifier by verifying that the hash matches the transaction identifier.

The particular transaction may be associated with control of a digital asset transferred as a result of validating the first transaction.

The particular transaction may be associated with a second digital asset different from a digital asset being transferred as a result of validating the first transaction.

S Validating the first transaction may succeed without verifying that an entity that created the first transaction has access to secret information.

The node may be a validation node of the blockchain network.

Validating the first transaction may further include, as a result of successful validation of the first transaction, adding the first transaction to a blockchain in the blockchain network.

The second script may be a locking script that imposes a set of conditions for validating the first transaction. Additionally or alternatively, execution of the locking script may cause the node to validate the first transaction by determining whether the set of conditions have been fulfilled.

The first script may be an unlocking script for satisfying the set of conditions of the second script.

The first script may specify a signature hash type. Additionally or alternatively, the second script, further as a result of being executed, may cause the node to obtain the signature hash type supplied as a result of execution of the first script.

The second script, may further as a result of being executed, cause the node to determine, based at least in part on the signature hash type, that the particular transaction is a member of a set of transactions associated with the first transaction.

The second script, further as a result of being executed, may cause the node to determine, based at least in part on the signature hash type, that the particular transaction corresponds to the second transaction.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

Therefore, in accordance with the invention there may be provided a method (and corresponding system(s)) as defined in the appended claims. The method may be described as a blockchain data constraint method. The method may include: i) receiving, at a node in a blockchain network, a first transaction to validate, the first transaction including a first script that includes at least: a first value, at least a portion of the first value including data that is unconstrained by a second script; and a second value; ii) obtaining a second transaction, the second transaction having been validated and including the second script that, as a result of being executed, causes the node to at least: obtain the first value and the second value as a result of execution of the first script; and validate, based at least in part on first value and the second value, that the data is associated with a particular source; and iii) validating the first transaction by executing the first script and the second script.

The second script may be a locking script that includes a set of conditions for validating the second transaction. Additionally or alternatively, the first script may be an unlocking script of for satisfying the set of conditions of the locking script.

Validating the first transaction may be performed without verifying that an entity that created the first transaction has access to secret information.

Unsuccessful validation that the data is associated with the data source may cause validating the first transaction to be unsuccessful.

An identity of the particular source may be unconstrained by the second script.

A particular transaction may be the particular source of the data. Additionally or alternatively, the first value may be a set of field values of the particular transaction. Additionally or alternatively, the second value may include a transaction identifier associated with the particular transaction. The second script, as a result of being executed, may validate that the data is associated with the data source by validating that the particular transaction corresponds to the transaction identifier.

The second script, as a result of being executed, may validate that the particular transaction corresponds to the transaction identifier by validating that the transaction identifier matches a hash of the set of fields of the particular transaction.

The first script, by including the set of fields of the particular transaction, may cause the node, as a result of execution of the first script, to make the set of fields of the particular transaction available as input to the second script.

The particular transaction may be the second transaction.

The data may be encoded in a field of the particular transaction.

The second script may constrain an identity of the particular source.

The second value may be a signature. Additionally or alternatively, the second script may further cause the node to obtain a public key associated with the data source and, additionally or alternatively, generate, based at least in part on the public key and the data, a modified public key. Additionally or alternatively, the second script, as a result of being executed, may validate that the data is associated with the data source based at least in part on the modified public key.

The modified public key may be generated by performing elliptic curve point multiplication on the public key by a value of the data.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

Therefore, in accordance with the invention there may be provided a method (and corresponding system(s)) as defined in the appended claims. The method may be described as a blockchain data constraint method. The method may include: i) receiving, at a node in a blockchain network, a first transaction to validate, the first transaction including a first script that, as a result of being executed, causes the node to at least obtain data and a first set of field values of the first transaction; ii) obtaining a second transaction, the second transaction including a second script that, as a result of being executed, causes the node to at least: determine, based at least in part on the data supplied as a result of execution of the first script, a set of constraints; and verify, based at least in part on the first set of field values, the set of constraints against the first transaction; and iii) validating the first transaction according to the set of constraints as a result of execution of the first script and the second script.

Validating the first transaction may be performed without verifying that an entity that created the first transaction has access to secret information.

An identity of a source of the data may be unconstrained by the second script.

The second script may constrain an identity of a source of the data.

The second script may include a public key of a particular data source usable to validate the data.

Validating the data may include generating, based at least in part on the public key and the data, a modified public key and, additionally or alternatively, determining that the data is associated with a data source based at least in part on the modified public key.

The set of constraints may be derived at least in part from a set of parameters in the data.

Fulfilment of the set of constraints may be a condition for reassociating of at least a portion of a digital asset.

Validating the first transaction may include reassociating the digital asset from a first entity to a second entity.

The set of constraints may further cause at least the portion of the digital asset to be reassociated with a third entity.

An identity of the second entity may be determined based at least in part on the set of constraints.

A source of the data may be the second transaction. Additionally or alternatively, the data includes a second set of field values of the second transaction. Additionally or alternatively, execution of the second script may cause the set of constraints to be derived at least in part from the second set of field values.

An identity of the second entity may be determined based at least in part on the set of constraints.

The set of constraints may further cause at least a portion of the digital asset to be reassociated with a third entity.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

Therefore, in accordance with the invention there may be provided a method (and corresponding system(s)) as defined in the appended claims. The method may be described as a blockchain data constraint method. The method may include: i) receiving, at a node in a blockchain network, a first transaction to validate, the first transaction including a first script that, as a result of being executed, causes the node to at least: obtain a first set of field values of the first transaction, the first set of field values including a third script; and obtain a second set of field values of a second transaction, the second set of field values including a copy of the second script; ii) obtaining the second transaction, the second transaction including a second script that, as a result of being executed, causes the node to, as a result of determining that a termination condition is unfulfilled, at least: obtain the third script from the first set of field values; and determine that the copy of the second script matches the third script; and iii) validating the first transaction as a result of execution of the first script and the second script.

The first script may be an unlocking script for satisfying a set of conditions of the second script.

The second script may a locking script that imposes the set of conditions for validating the first transaction.

The third script may be a locking script that imposes the set of conditions for validation of a future transaction.

The second transaction may be a transaction associated with the digital asset. Additionally or alternatively, the first transaction may be a transaction is a transaction to reassociate at least the portion of the digital asset from a first entity to a second entity.

Validating the first transaction may include reassociating a digital asset from a first entity to a second entity.

Determining that a termination condition is unfulfilled may include determining that an amount of a digital asset associated with the second transaction is sufficient to reassociate at least a portion of the digital asset.

The third script may be embedded in a field value of the first set of field values.

The blockchain network may be comprised of distributed electronic devices running an instance of a blockchain protocol.

Validating the first transaction may be performed without verifying that an entity that created the first transaction has access to a secret information.

The second script may further cause the node to verify, as a further condition for validating the first transaction, that the first transaction meets an additional constraint.

The first and second transactions may be members of a set of repeating smart contracts associated with the digital asset.

The set of repeating smart contracts may be terminated by the termination condition.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

Therefore, in accordance with the invention there may be provided a method (and corresponding system(s)) as defined in the appended claims. The method may be described as a blockchain data constraint method. The method may include: i) receiving, at a node in a blockchain network, a first transaction to validate, the first transaction including a first script that, as a result of being executed, causes the node to at least obtain a first set of field values of the first transaction, a second set of field values of a second transaction, and an input; ii) obtaining the second transaction, the second transaction including a second script that includes a set of rules, the second script, as a result of being executed, causing the node to at least: verify that the second script matches a third script embedded in the first set of field values; determine, based at least in part on the second set of field values, a current state; and determine, based at least in part on the current state, the input, and the set of rules, a next state; verify that the next state is included in the first set of field values; and iii) validating the first transaction as a result of execution of the first script and the second script.

The second script may constrain an identity of a source of the input.

Any of the methods as claimed may further comprise verifying a cryptographic secret of a source of the input.

The set of rules may be a state-transition matrix.

The third script may be a locking script that imposes a set of conditions for validation of a future transaction.

The second script may further cause the node to determine that a termination condition is unfulfilled.

The input may be embedded in the second set of field values.

The termination condition may be that the digital asset associated with the second transaction is of insufficient size to be transferred.

Validating the first transaction may include reassociating a digital asset from a first entity to a second entity.

The current state may indicate a state of the second transaction.

The next state may indicate a state of the first transaction upon validation.

Any of the methods as claimed may further comprise receiving a third transaction. Additionally or alternatively, any of the methods as claimed may further comprise obtaining a fourth script from the first transaction, the fourth script, as a result of being executed, causing the node to determine, based at least in part on the next state, a second input, and the set of rules, another state different from the next state and the current state.

The current state and the next state may be members of a set of possible states for the first and second transactions.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

These and other aspects of the present invention will be apparent from and elucidated with reference to the embodiment described herein. An embodiment of the present invention will now be described, by way of example only, and with reference to the accompanying drawings, in which.

Figure 1:
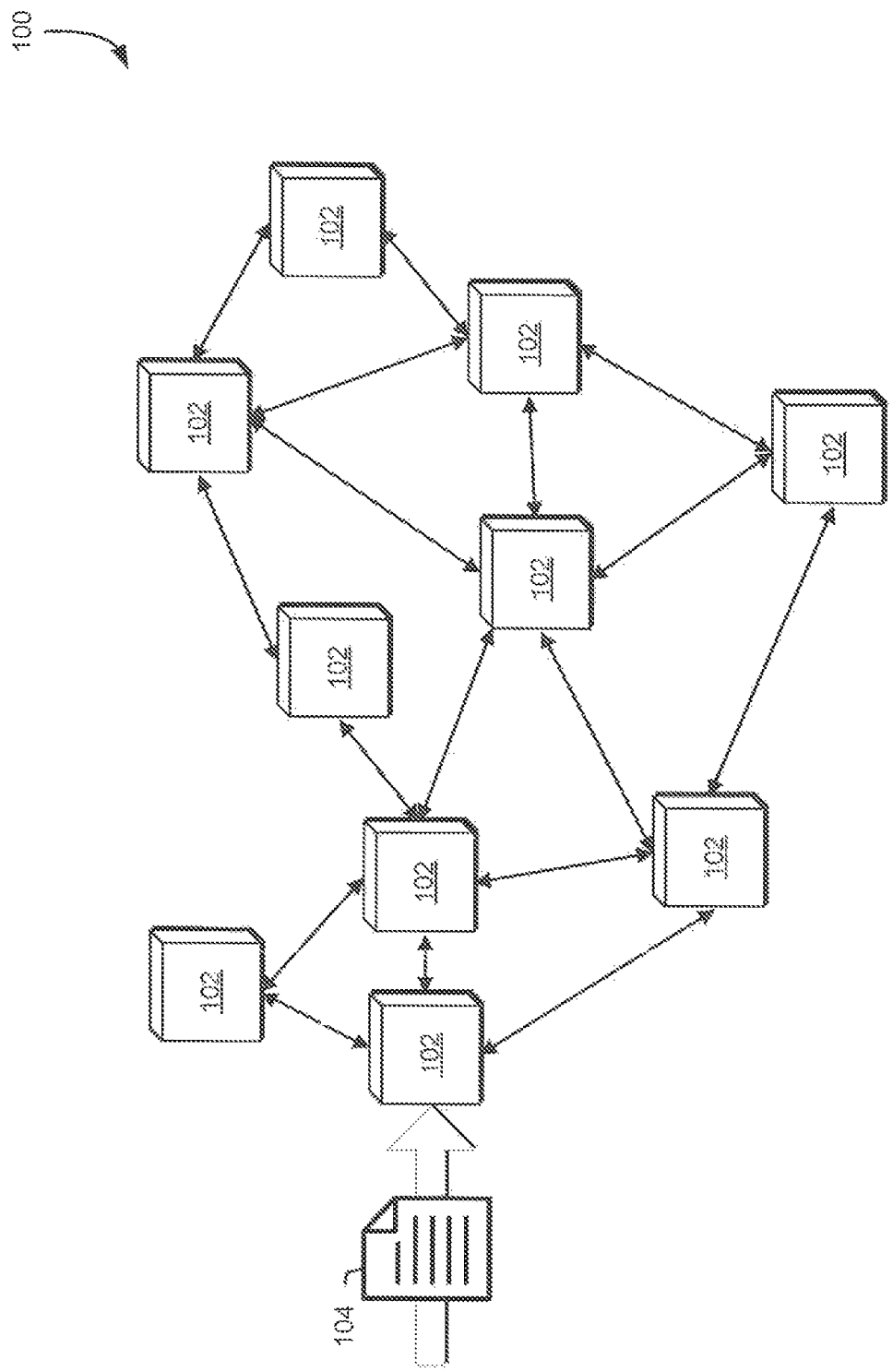
FIG. 1 illustrates a blockchain environment in which various embodiments can be implemented.

Reference will first be made to FIG. 1, which illustrates an example blockchain network 100 associated with a blockchain in accordance with an embodiment of the present disclosure. In the embodiment, the example blockchain network 100 is comprised of peer-to-peer distributed electronic devices running an instance of the blockchain protocol. In some examples, the distributed electronic devices are referred to as nodes 102. An example of a blockchain protocol is a Bitcoin protocol.

Figure 26:
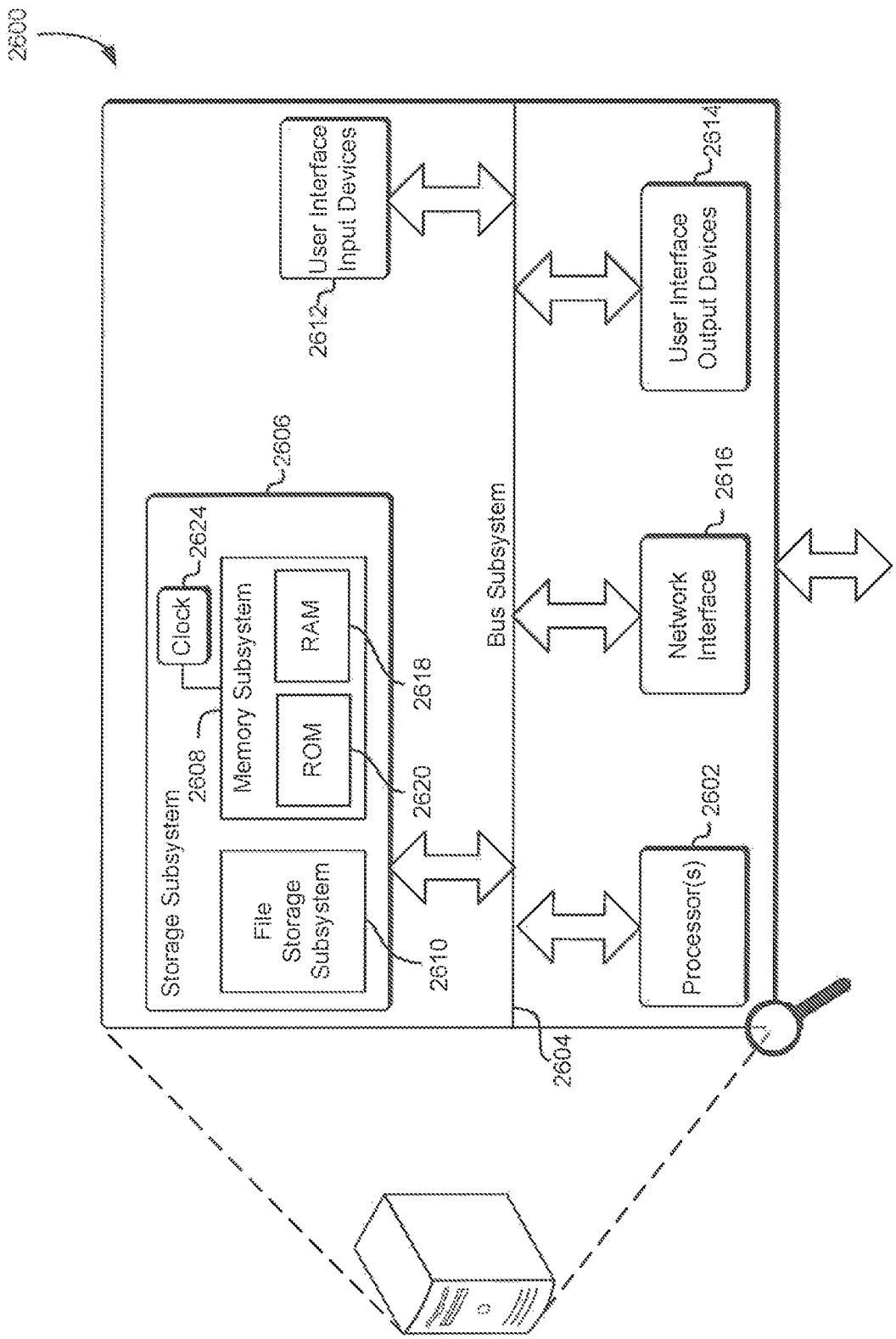
FIG. 26 illustrates a computing environment in which various embodiments can be implemented.

The nodes 102 may be comprised of any suitable computing device (e.g., by a server in a data centre, by a client computing device (e.g., a desktop computer, laptop computer, tablet computer, smartphone, etc.), by multiple computing devices in a distributed system of a computing resource service provider, or by any suitable electronic client device such as the computing device 2600 of FIG. 26).

In an embodiment, one or more of the nodes 102 are communicatively coupled to one or more other of the nodes 102. Such communicative coupling can include one or more of wired or wireless communication. In the embodiment, the nodes 102 each maintain at least a portion of a "ledger" of all transactions in the blockchain. In this manner, the ledger is a distributed ledger. A transaction processed by a node that affects the ledger is verifiable by one or more of the other nodes such that the integrity of the ledger is maintained.

In an embodiment, at least some of the nodes 102 are miner nodes that perform complex calculations, such as solving cryptographic problems. A miner node that solves the cryptographic problem creates a new block for the blockchain and broadcasts the new block to others of the nodes 102. The others of the nodes 102 verify the work of the miner node and, upon verification, accept the block into the blockchain (e.g., by adding it to the distributed ledger of the blockchain). In some examples, a block is a group of transactions, often marked with a timestamp and a "fingerprint" (e.g., a hash) of the previous block. In this manner, each block becomes linked to a previous block, thereby creating the "chain" that links the blocks in the blockchain. In embodiments, valid blocks are added to the blockchain by a consensus of the nodes 102. Also in some examples, a blockchain comprises a list of validated blocks.

In an embodiment, at least some of the nodes 102 operate as validating nodes that validate transactions as described in the present disclosure. In some examples, a transaction includes data that provides proof of ownership of a digital asset (e.g., a number of Bitcoins) and conditions for accepting or transferring ownership/control of the digital asset. In some examples, a "unlocking transaction" refers to a transaction that reassociates (e.g., transferring ownership or control) at least a portion of a digital asset, indicated by an unspent transaction output (UTXO) of a previous transaction, to an entity associated with a blockchain address. In some examples, a "previous transaction" refers to a transaction that contains the UTXO being referenced by the unlocking transaction. In some embodiments, the transaction includes a "locking script" that encumbers the transaction with conditions that must be fulfilled before ownership/control can be transferred ("unlocked"). In some embodiments, the blockchain address is a string of alphanumeric characters that is associated with an entity to which control of at least a portion of a digital asset is being transferred/reassociated. In some blockchain protocols implemented in some embodiments, there is a one-to-one correspondence between a public key associated with the entity and the blockchain address. Validation of transactions may involve validating one or more conditions specified in a locking script and/or unlocking script. Upon successful validation of the transaction 104, the validation node adds the transaction 104 to the blockchain and distributes it to the nodes 102.

Figure 2:
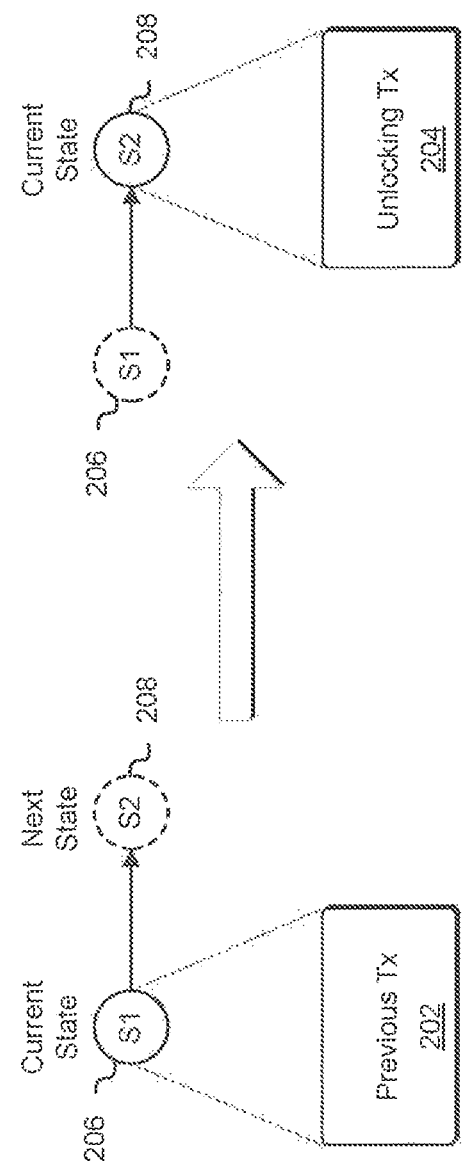
FIG. 2 illustrates an example of a trustless, deterministic state machine in accordance with an embodiment.

FIG. 2, which illustrates an example embodiment 200 of the present disclosure. Specifically, FIG. 2 depicts a previous blockchain transaction 202 that encodes a first state 206 and an unlocking blockchain transaction 204 that encodes a second state 208. In the example embodiment 200, the first state 206 at a first time is represented as a parameter embedded in the previous blockchain transaction 202. Further details on parameterizing constraints are found in the description of FIG. 16. The unlocking blockchain transaction 204 will include a parameter representing the second state 208.

In the example embodiment 200, the transactions 202 and 204 are sets of field values that contain one or more inputs and one or more outputs. In some embodiments, the inputs and outputs reflect intent to reassociate at least a portion of the digital asset from at least one entity to at least another entity. In the example embodiment 200, the previous blockchain transaction 202 is the most current, confirmed transaction that is included in the blockchain. In the example embodiment 200, the unlocking blockchain transaction 204 is the immediate future transaction, which is yet to be confirmed and is not yet included in the blockchain. Each of the inputs of the unlocking blockchain transaction 204 receives an output of the previous blockchain transaction 202.

Some blockchain technologies, like Bitcoin, use an elliptic curve digital signature algorithm (ECDSA) as a mathematical scheme for digital signatures. In embodiments, the ECDSA is a cryptographic digital signature used to secure an UTXO from being obtained by an unapproved entity. An elliptic curve digital signature (ECDS) in Bitcoin typically appears with a signature hash flag (SIGHASH type) appended to the end; however, it is contemplated that techniques of the present disclosure are usable with blockchain technologies that do not implement a SIGHASH type. In such blockchain technologies, the ECDS is contemplated to conform to the signature generation principles of the particular blockchain technologies.

In embodiments, SIGHASH type refers to the set of fields to be extracted from a transaction before being serialized (e.g., canonicalized) and hashed. For example, the SIGHASH type can affect which fields of the transaction are included in the signature. In some examples, SIGHASH type can be one or more of SIGHASH_ALL, SIGHASH_NONE, SIGHASH_SINGLE, or SIGHASH_ANYONECANPAY. In an embodiment, the type SIGHASH_ALL indicates that all fields in the transaction are to be hashed and signed, except for the input scripts. In an embodiment, the type SIGHASH_NONE indicates that the outputs need not be signed, which can allow others to update the transaction. In an embodiment, the type SIGHASH_SINGLE indicates that inputs are signed but the sequence numbers are blanked, so others can create new versions of the transaction, but the only output that is signed is the one at the same position as the input. In an embodiment, the type SIGHASH_ANYONECANPAY is combined with the other types and indicates that the input that includes SIGHASH_ANYONECANPAY is signed but that other inputs need not be signed. The SIGHASH type can be represented by a value that indicates the SIGHASH type. For example, in some implementations SIGHASH_ALL is represented by a byte with a value of 1, SIGHASH_NONE is represented by a byte with a value of 2, SIGHASH_SINGLE is represented by a byte with a value of 3, and SIGHASH_ANYONECANPAY is represented by a byte with a value of 80. Combining SIGHASH types, in some implementations, is performed by adding the byte values together.

In some examples, a set of transaction fields determined by SIGHASH type refers to a subset, as determined by the SIGHASH type, of the corresponding transaction encoded in bytes. For example, with the SIGHASH type of SIGHASH_ANYONECANPAY, only one transaction input is included within a signature.

In an embodiment, the ECDS is represented by a pair of 256 bit numbers (r,s) encoded in distinguished encoding rules (DER) format. Note, however, that the techniques of the present disclosure are usable with other encoding formats, such as basic encoding rules (BER) or canonical encoding rules (CER). Parameters used in the ECDSA include K (an elliptic curve point with coordinates (x,y)), k (a 256-bit number; usually random to protect the private key), G (a base point on the elliptic curve with order n: n×G=0, where 0 represents an identity elliptic curve point), n is a large prime number used as a parameter in the elliptic curve finite field, r (one of the 256-bit numbers in the ECDS), s (the other of the 256-bit numbers in the signature), $k^{-1}$ (a modular multiplicative inverse of k; i.e., $k^{-1}$ k≡1 mod n), m (the message/data being signed; in embodiments it is resized to 256 bits by a hash function), a (a private key; e.g., a 256 bit number). In the embodiment, the ECDS is generated as follows.

First, the elliptic curve point K is determined from by multiplying k with the generator:

$$K = k \times G$$

Then, the point x is determined from K, and the first of the 256-bit numbers in the ECDS, r, is determined according to the formula:

$$r = x \bmod n$$

Then, the second of the 256-bit numbers in the ECDS, s, is determined according to the formula:

$$s = k^{-1}(m + r \times a) \bmod n$$

Lastly, (r,s) is encoded in DER format. Given signature (r,s), message/data m, and the public key A that corresponds to the private key a, the signature is verifiable. To verify the signature, $v = s^{-1} \times (m \times G + r \times y)$ is calculated. If v=r, the signature is valid.

Bitcoin uses a scripting system called "Script". In the present disclosure, various script operation codes and keywords are referenced for performing various operations. However, it is contemplated that other blockchain technologies could implement different instruction sets, and therefore the operation codes described in the present disclosure are considered illustrative of the operations performed by the operation code rather than the specific operation code in Script. In some embodiments, the scripting system is a Turing incomplete instruction set (e.g., lacks support for loops, recursion, goto statements, etc.). In other embodiments, the scripting system is a Turing complete instruction set.

Certain embodiments of the present disclosure operate under the assumption that the scripting system or other system for implementing the sets of instructions described allow for more than 200 instructions (e.g., operation codes) in a single script. Likewise, certain embodiments of the present disclosure further assume that:

- the functionality provided by the operation codes referred to in the present disclosure are present and enabled in the system that executes the operation codes scripts/sets of instructions; and/or
- That the required functionality can be can be implemented by the creation of customized functions which are written to provide the desired behavior. These customized functions might be written to implement the functionality of op_codes which are present in the language but have been disabled, or may be "new" op_codes which provide specific functionality not natively provided for in the scripting language itself.

Examples of the operation codes referred to in the present disclosure include:

OP_ECPX, which returns the x-coordinate of the elliptic curve point
OP_ADD, which adds the top two items on the stack
OP_BIGMOD, which returns the remainder after dividing the top two items on the stack
OP_BIGMODADD, which performs modulus addition of the top two items of the stack modulus the third item of the stack
OP_BIGMODINVERSE, which performs modulus negative exponent operation
OP_BIGMODMUL, which performs modulus multiplication of the top two items of the stack modulus third item of the stack
OP_CAT, which concatenates the top two items on the stack
OP_CHECKSIG, in which a public key and signature are popped from the stack and verified against a signature of the transaction fields according to the SIGHASH type. If the signature is valid, 1 is returned, 0 otherwise.
OP_CHECKSIGVERIFY, which functions the same as OP_CHECKSIG, but OP_VERIFY is executed afterward
OP_DERENCODE, which encodes the top two items on the stack in DER format
OP_DUP, which duplicates the top stack item
OP_ECPMULT, which performs elliptic curve point multiplication (also referred to as elliptic curve scalar multiplication) of the top two items on the stack
OP_ELSE, which, if the preceding OP_IF or OP_NOTIF or OP_ELSE was not executed, then these statements are executed; otherwise, if the preceding OP_IF or OP_NOTIF or OP_ELSE was executed, then these statements are not executed
OP_ENDIF, which ends an if/else block
OP_EQUAL, which returns 1 if the inputs are exactly equal, 0 otherwise
OP_EQUALVERIFY, which is the same as OP_EQUAL, but runs OP_VERIFY afterward
OP_FROMALTSTACK, which puts the input onto the top of the main stack and removes it from the alternate stack
OP_HASH256, in which the input is hashed twice: first with SHA-256 and then with RIPEMD-160
OP_IF, which, if the top stack value is not False, the statements are executed and the top stack value is removed
OP_MUL, which multiplies the top two items on the stack
OP_NOTIF, which, if the top stack value is False, the statements are executed and the top stack value is removed
OP_ROLL, in which the item that is n items deep in the stack is moved to the top
OP_SUBSTR, which returns a section of a string
OP_SWAP, in which the top two items on the stack are swapped
OP_TOALTSTACK, which puts the input onto the top of the alternate stack and removes it from the main stack
OP_VERIFY, which marks the transaction as invalid if top stack value is not true In an embodiment, an ECDS generation script can be created using operation codes, which can be extended to create a signature generation script OP_GENSIG by appending a SIGHASH byte to the end.

TABLE 1

| Type | Script |
|---|---|
| Inputs | <SIGHASH Byte><m><a><k> |
| OP_GENSIG | // K = k × G |
| | OP_DUP OP_TOALTSTACK <PubK G> |
| | OP_ECPMULT |
| | // r = x mod n |
| | OP_ECPX <N> OP_BIGMOD OP_DUP |
| | OP_TOALTSTACK |
| | // $k^{-1}(r \times d + m)$ mod n |
| | <N> OP_BIGMODMUL <N> OP_BIGMODADD |
| | OP_FROMALTSTACK OP_SWAP |
| | OP_FROMALTSTACK <N> |
| | OP_BIGMODINVERSE <N> OP_BIGMODMUL |
| | // DER encode (r,s) and append SIGHASH Type |
| | OP_DERENCODE OP_SWAP OP_CAT |

In the above script, the <SIGHASH Byte>, message <m>, private key <a>, and the number <k> are input into a main (last-in first-out) stack in the above order. Execution of the script operations "OP_DUP OP_TOALTSTACK <PubK G> OP_ECPMULT" causes the number <k> to be copied to the alternate stack, and <k> is multiplied against the elliptic curve generator <PubK G> to produce elliptic curve point K at the top of the main stack. Execution of the script operations "OP_ECPX <N> OP_BIGMOD OP_DUP OP_TOALTSTACK" causes r to be calculated from x-coordinate of K modulus n. A copy of r is pushed to the alternate stack. Execution of the script operations of "<N> OP_BIGMODMUL <N> OP_BIGMODADD OP_FROMALTSTACK OP_SWAP OP_FROMALTSTACK <N> OP_BIGMODINVERSE <N> OP_BIGMODMUL" computes s from =$k^{-1}$ (m+r×a) mod n. Finally, execution of the script operations of "OP_DERENCODE OP_SWAP OP_CAT" cause r and s to be encoded in DER format and concatenated with <SIGHASH Byte>. In the present disclosure, this script is referred to as OP_GENSIG. Thus, references to OP_GENSIG in embodiments of the present disclosure should be viewed as shorthand for the operations executed in the above script.

Figure 3:
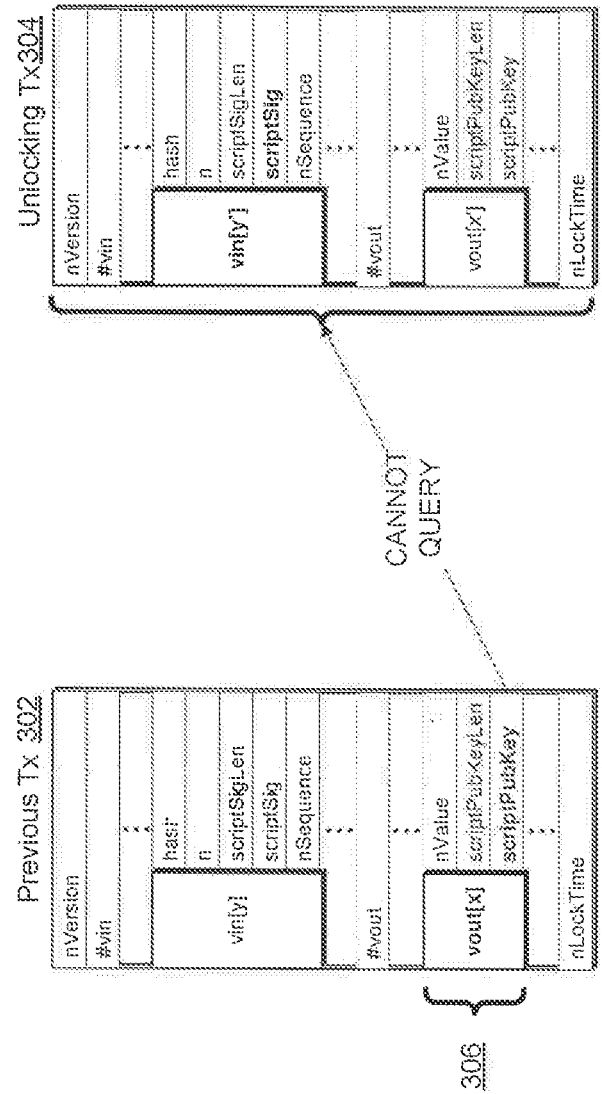
FIG. 3 illustrates an example of a problem associated with locking scripts that is solved by an embodiment.

FIG. 3 is an example 300 illustrating a problem associated with blockchain transactions solved by an embodiment of the present disclosure. That is, in the example 300 embodiment illustrated in FIG. 3, a locking script 306 in a previous transaction 302 is unable to directly read fields of the Unlocking transaction 304. As noted, in some embodiments, the previous transaction 302 is the most current, confirmed transaction that is included in a blockchain. Likewise, in some embodiments, the unlocking transaction 304 is a future transaction, which is yet to be confirmed and not yet included in the blockchain, that represents an attempt to reassociate at least a portion of a digital asset controlled by the previous transaction 302

As noted above, in some embodiments, the locking script 306 is a script that encumbers the transaction by specifying conditions that are required to be met in order to transfer the output. More particularly, executing the locking script 306 is configured to, as a result of execution by a validating node of a blockchain system, accept data from an executed unlocking script and perform certain operations based on the data and return a result that indicates whether execution of the unlocking script successfully "unlocked" (i.e., fulfilled the set of conditions set within) the locking script. In some embodiments, the locking script 306 defines one or more data constraints that must be satisfied (e.g., by data provided via the unlocking script) in order for validation of the transaction to be successful. For example, the locking script 306 could require that certain data be provided in an unlocking script to unlock the associated digital assets of the previous transaction 302.

Figure 4:
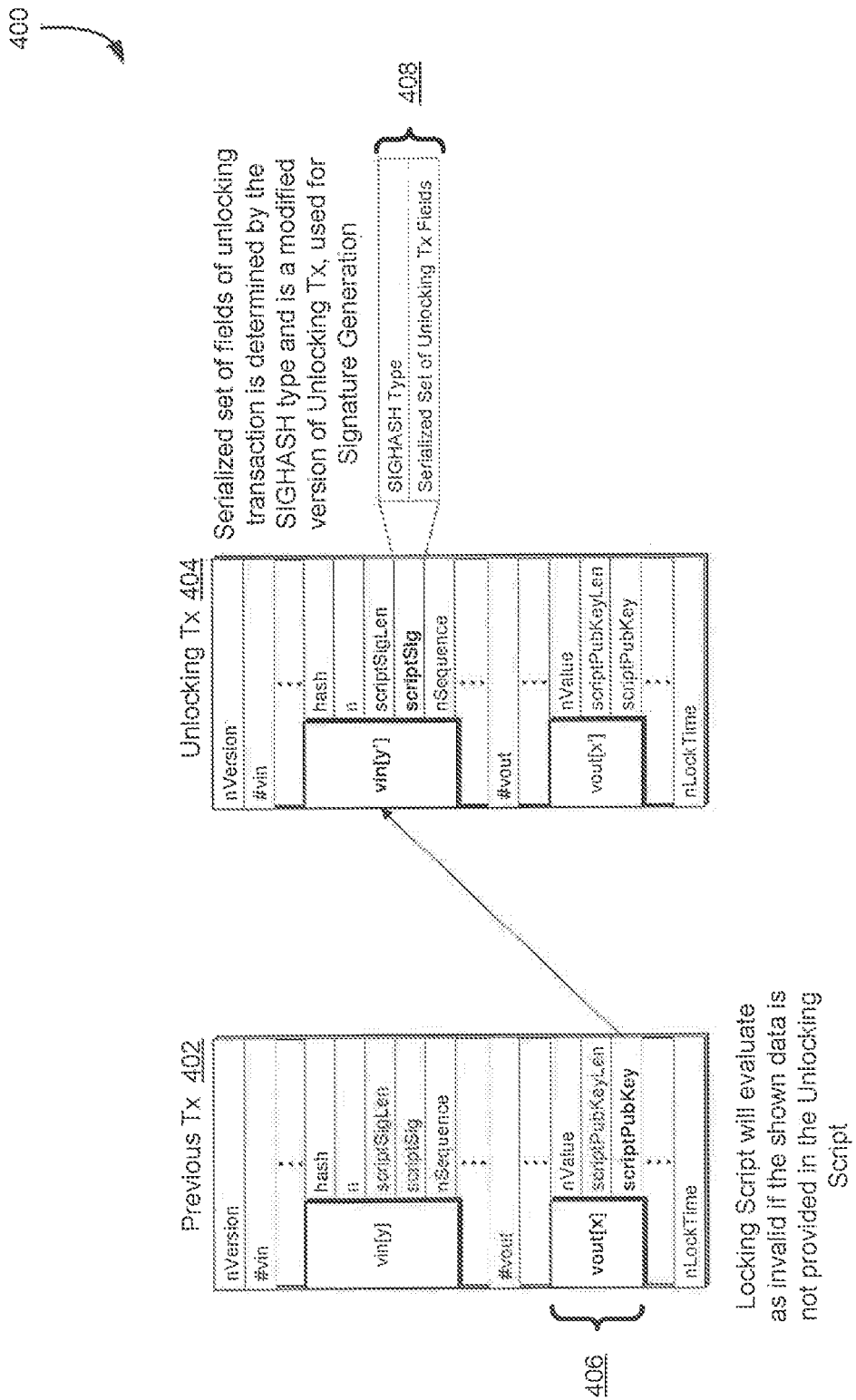
FIG. 4 illustrates an example of data accessible to an unlocking script in accordance with an embodiment.

FIG. 4 depicts an example 400 illustrating that an unlocking script 408, unlike a locking script 406 of a previous transaction 402, of the present disclosure has access to fields (e.g., the set of unlocking transaction fields determined according to the SIGHASH type) of an unlocking transaction 404 in an embodiment. In some embodiments, the previous transaction 402 is similar to the previous transaction 302 of FIG. 3. In some embodiments, the unlocking transaction 404 is similar to the unlocking transaction 304. In some embodiments, the locking script 406 has similar characteristics to the locking script 306 of FIG. 3.

In some embodiments, the unlocking script 408 is an executable script placed on the inputs of a transaction that attempt to satisfy the set of conditions placed on an output of a transaction by the locking script. The unlocking script is also known as "scriptSig". As noted above, the unlocking script 408 has been designed to provide the set of unlocking transaction fields determined according to the SIGHASH type as input to the locking script, thereby giving the locking script access to the fields of the unlocking transaction. Further details regarding the contents and construction of the serialized transaction can be found in the description of FIG. 5 below. Note that, in embodiments, the transactions 402 and 404 comprise additional fields. For example, in some embodiments, "nVersion" refers to a blockchain protocol version, "#vin" refers to a count of a number of inputs of the transaction, "hash" refers to a pay-to-public-key-hash of the entity from which the digital asset is being reassociated, "#vout" refers to a count of a number of outputs of the transaction, "nValue" refers to an amount of unspent digital asset remaining, and "nLockTime" refers to a timestamp of when the transaction becomes final.

Figure 5:
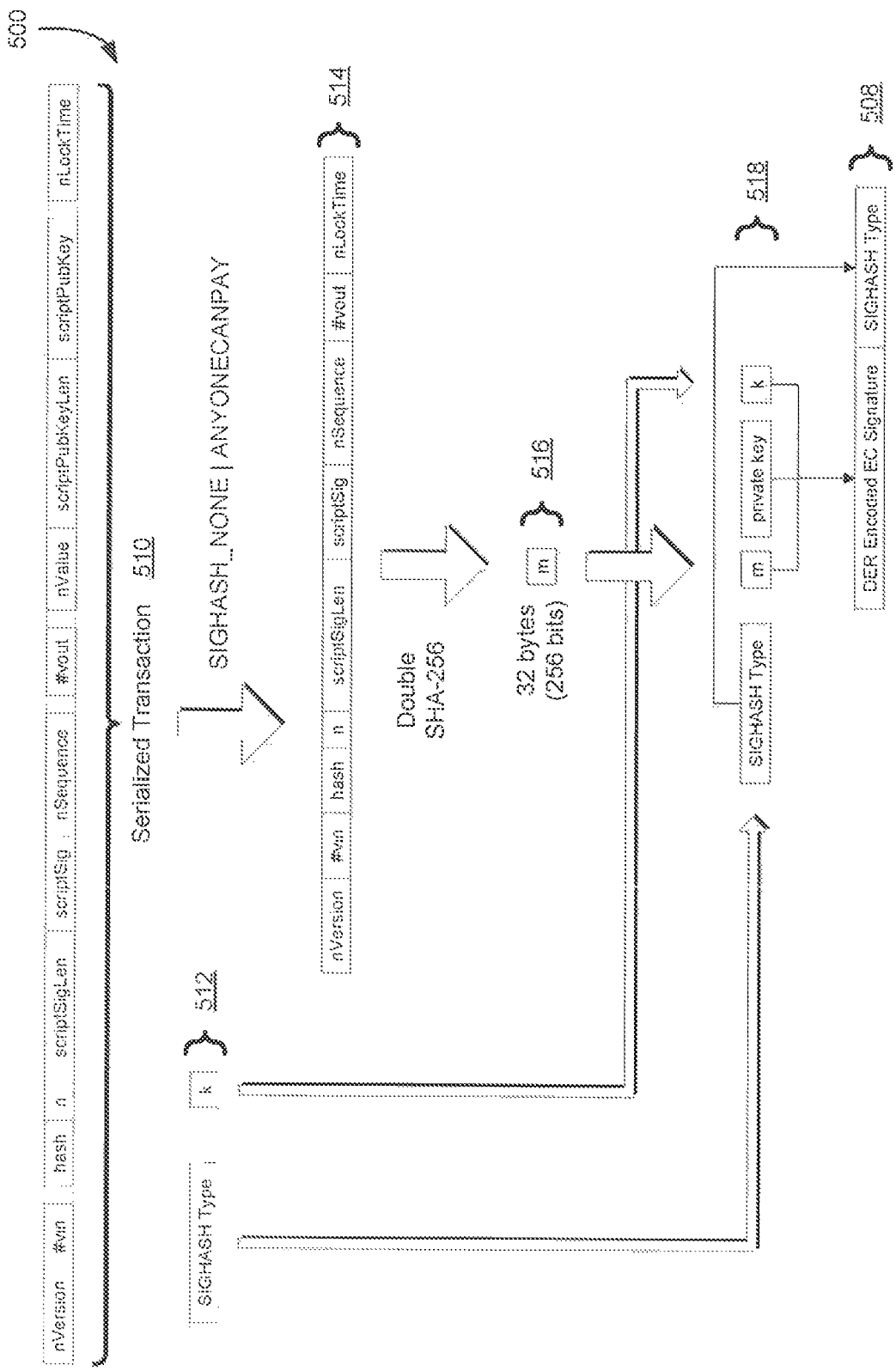
FIG. 5 illustrates an example of generating a signature from a serialized set of transaction fields in accordance with an embodiment.

FIG. 5 illustrates an example 500 of how a serialized set of transaction fields is formed. As illustrated in FIG. 5, a serialized transaction 510 (i.e., the transaction represented in a series of bytes of a particular format) comprises a set of field values of a transaction. The signer, in 512, chooses a SIGHASH type and a number k. The number k is typically a random or pseudorandom number in order to mask/protect the private key and therefore is referred to at times in the present disclosure as a "mask number". The modified copy of the transaction 514 is an example of a set of fields of the serialized transaction 510 that are selected in accordance with the specified SIGHASH type (e.g., in the example 500 is SIGHASH_NONE+ANYONECANPAY). The signer hashes (e.g., performs a double SHA-256 hash) the modified copy of the transaction 514, which results in a message, m 516. The signer then creates a signature using the SIGHASH type, message m, the signer's private key, and the number k, such as in the manner described above in conjunction with FIG. 2.

The table below illustrates an example of a typical unlocking and unlocking script, whereby the supposed signature of entity A specified in the unlocking script is checked against entity A's public key using the OP_CHECKSIG operation code.

TABLE 2

| Unlocking Script | Locking Script |
| --- | --- |
| <Sig A> | <PubK A> OP_CHECKSIG |

Thus, with the understanding of the signature generation of FIG. 5, the following table illustrates an example of unlocking and locking scripts if part of the procedure illustrated in example 500 is moved to within the unlocking script.

TABLE 3

| Unlocking Script | Locking Script |
| --- | --- |
| <SIGHASH Type><m><a><k> OP_GENSIG | <PubK A> OP_CHECKSIG |

The unlocking script can be further modified to include the steps of calculating message m in the unlocking script.

TABLE 4

| Unlocking Script | Locking Script |
| --- | --- |
| <SIGHASH Type>< Serialized Set of Unlocking Tx Fields> OP_HASH256 <a><k> OP_GENSIG | <PubK A> OP_CHECKSIG |

Note, however, that except for the SIGHASH type and the set of unlocking transaction fields determined according to the SIGHASH type, the other operations of the procedure can be moved to the locking script.

TABLE 5

| Unlocking Script | Locking Script |
| --- | --- |
| <SIGHASH Type><Serialized Set of Unlocking Tx Fields> | OP_HASH256 <a><k> OP_GENSIG <PubK A> OP_CHECKSIG |

Thus, by moving the operations of "OP_HASH256 <a><k> OP_GENSIG" inside the locking script the unlocking script is caused to contain the SIGHASH type and set of unlocking transaction fields determined according to the SIGHASH type in order to be valid.

In this manner, a serialized previous transaction is caused to be injected into the locking script. The table below illustrates how the locking and unlocking scripts perform each step procedure of example 500 and validates the transaction.

TABLE 6

| Unlocking Script | Locking Script |
| --- | --- |
| <SIGHASH Type><br><Serialized Set of Unlocking Tx Fields> | // Double SHA256 the Message<br>OP_HASH256<br>// Generate a Signature using SIGHASH Type, Message, Private Key and k<br><a><k> OP_GENSIG<br>// Perform Signature Verification<br><PubK A> OP_CHECKSIG |

In the present disclosure, the above script may be referred to as OP_UNLOCKINGTXINJECTION Thus, references to OP_UNLOCKINGTXINJECTION in embodiments of the present disclosure should be viewed as shorthand for the operations executed in the above script. Note, however, that any entity that provides the SIGHASH type and set of unlocking transaction fields determined according to the SIGHASH type can receive the transaction output. However, this becomes a useful feature as described in further detail below. As noted above, in some examples, receiving transaction output refers to creating an unlocking transaction that references the transaction output and will evaluate as valid, which will thereby cause the transaction output to be received.

Figure 6:
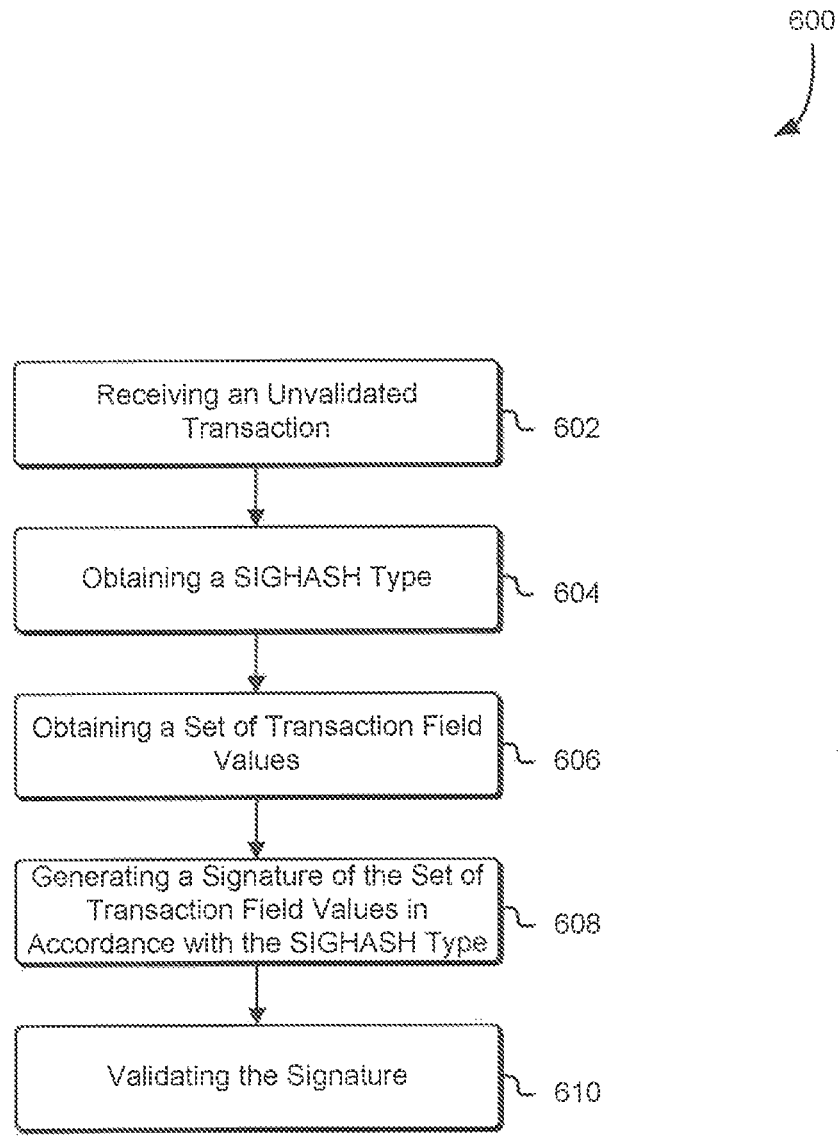
FIG. 6 is a flow diagram that illustrates an example of causing an injection of a serialized set of unlocking transaction fields in accordance with an embodiment.

FIG. 6 is a flowchart illustrating an example of a process 600 for causing an injection of a set of unlocking transaction fields, determined according to the SIGHASH type, in accordance with an embodiment in accordance with various embodiments. Some or all of the process 600 (or any other processes described, or variations and/or combinations of those processes) can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media).

For example, some or all of process 600 can be performed by a validation node in a blockchain network, such as the example blockchain network 100 of FIG. 1. Such a validation node may be comprised of any suitable computing device (e.g., by a server in a data centre, by a client computing device, by multiple computing devices in a distributed system of a computing resource service provider, or by any suitable electronic client device such as the computing device 2600 of FIG. 26). The process 600 includes a series of operations wherein the system performing the process 600 executes an unlocking script and locking script of an unvalidated transaction in conjunction in the manner described in FIG. 5 and, as a result, obtains a SIGHASH type and a set of transaction field values, generates a signature, and validates the signature.

In 602, the system obtains an unvalidated transaction from an entity seeking to reassociate at least a portion of a digital asset. The unvalidated transaction includes a locking script and unlocking script. The unlocking script is executed by the system prior to executing the locking script. The unlocking script may be similar to the unlocking script shown in Tables 5 and 6 above, and specifies a SIGHASH type and includes a serialized set of fields of the unvalidated transaction. Consequently, in 604 and 606, the system performing the process 600 obtains the SIGHASH type and the serialized set of transaction field values of the unvalidated transaction from the unlocking script and places them in the main stack. Upon successful completion of execution of the unlocking script, the system begins execution of the locking script using the state of the main stack (and in some implementations the state of the alternate stack) at the time of completion of execution of the unlocking script. The locking script may be similar to the locking scripts shown in Tables 5 and 6 above.

In 608, in accordance with the locking script, the system generates a signature using at least the SIGHASH type and the set of transaction field values placed on the main stack as a result of execution of the unlocking script and a private key associated with a public-private key pair. In 610, in accordance with the locking script, the system successfully validates the signature against the public key of the key pairs. In this manner, the set of transaction fields is caused to be injected into the locking script by the unlocking script. Note that the operations 602-10 may be performed in various orders and combinations, depending on implementation, and that some of the operations may be performed in parallel with other operations of the process 600.

Figure 7:
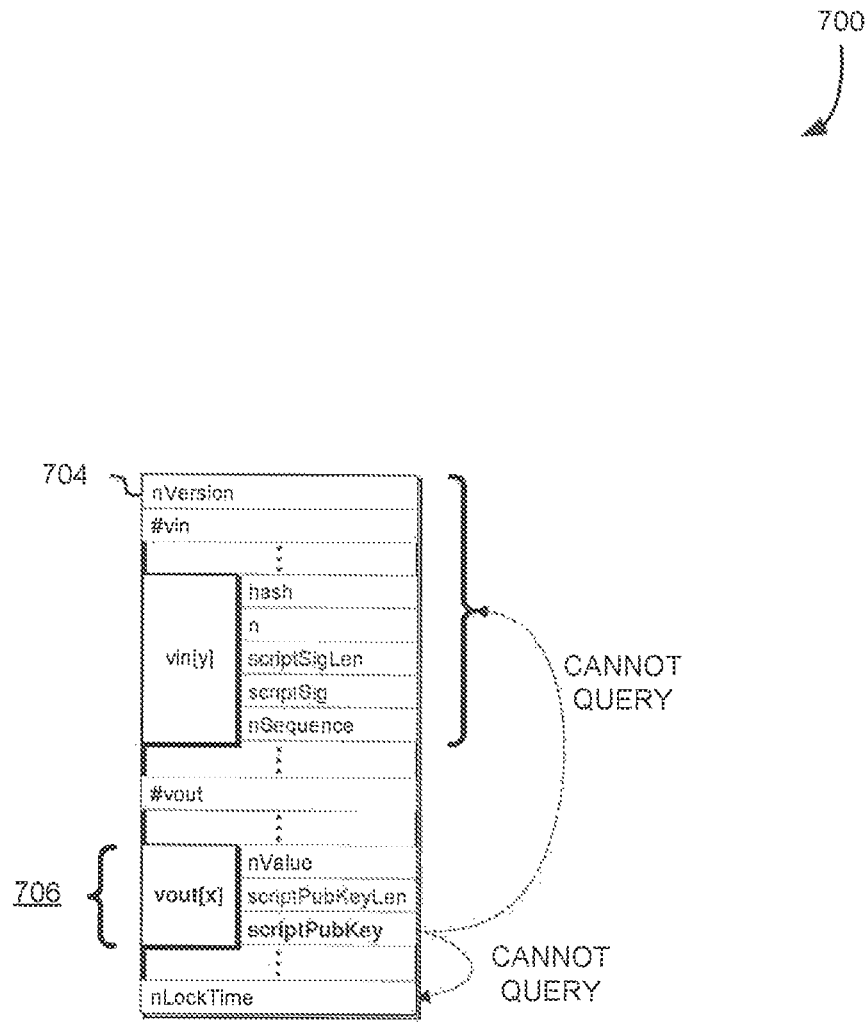
FIG. 7 illustrates another example of a problem associated with locking scripts that is solved by an embodiment.

FIG. 7 is an example 700 illustrating a problem associated with blockchain transaction that is solved by an embodiment of the present disclosure. That is, in the example 700 illustrated in FIG. 7, a locking script 706 is unable to read the inputs of the transaction that it is embedded in and, consequently, is unable to directly read fields of a previous transaction. In some embodiments, the transaction 704 is similar to the unlocking transaction 304 of FIG. 3, which represents an attempt to reassociate at least a portion of a digital asset controlled by a previous transaction. As noted above, in some embodiments, the locking script 706 is a script that encumbers the transaction by specifying conditions that are required to be met in order to transfer the output, similar to the locking script 306 of FIG. 3.

Figure 8:
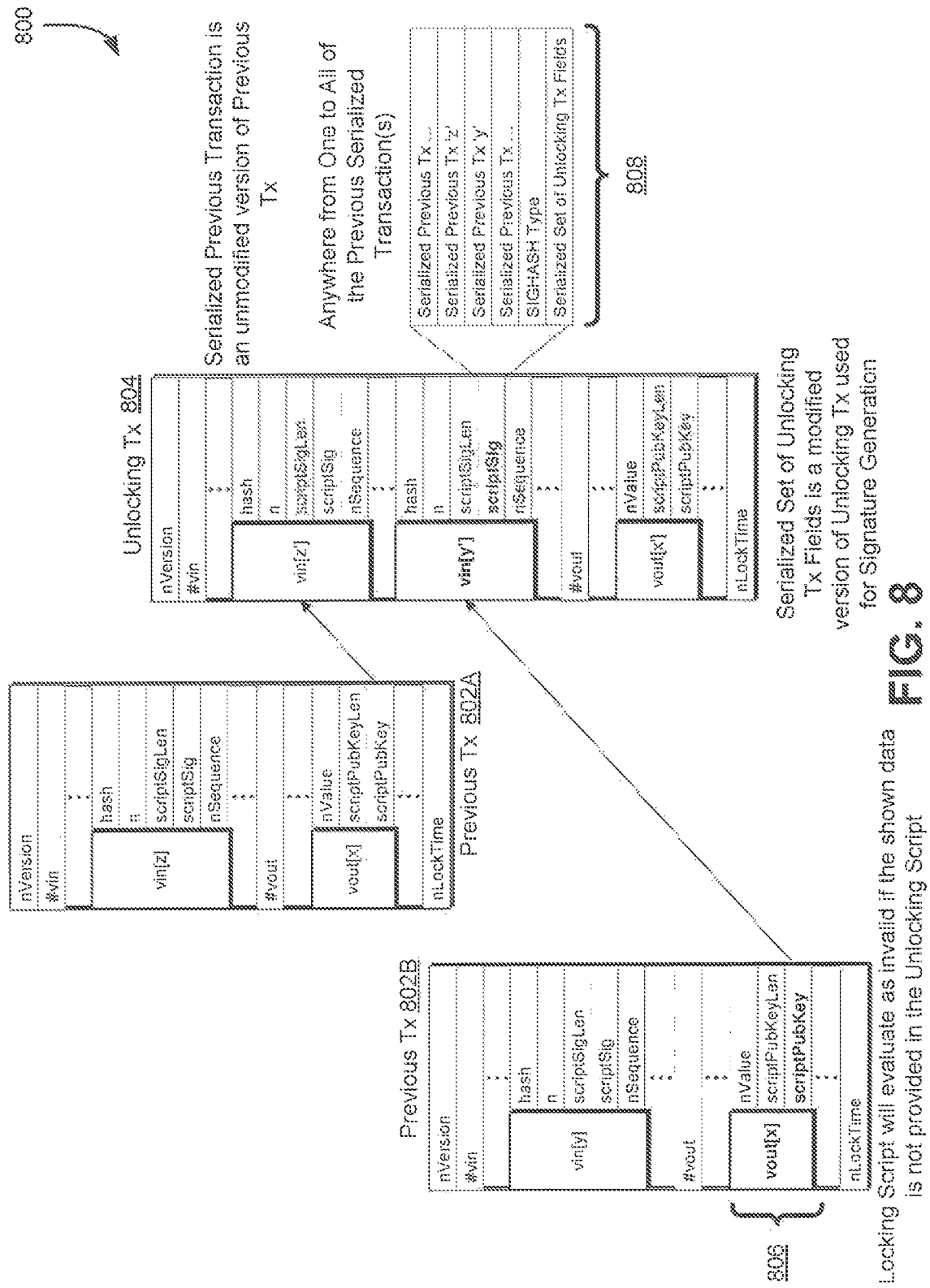
FIG. 8 illustrates an example of causing an injection of a serialized previous transaction in accordance with an embodiment.

FIG. 8 illustrates an example 800 of causing an unlocking script 808 to contain a serialized previous transaction by extracting transaction IDs and performing constraint checking. Specifically, FIG. 8 depicts an unlocking transaction 804 having an unlocking script 808 utilizing the output from previous transactions 802A-02B. As can be seen, the unlocking script 808 causes the serialized previous transactions to be retrieved. In some examples, a serialized previous transaction refers to an unmodified version of a set of field values of a previous transaction.

The embodiment depicted in FIG. 8 can be understood by observing that the transaction ID is a double SHA-256 of a serialized transaction and that the transaction ID has a one-to-one mapping to a transaction. Thus, a transaction can be caused to be injected into an unlocking script by applying the constraint shown in table 7 below.

TABLE 7

| Unlocking Script | Locking Script |
| --- | --- |
| <Serialized Tx> | OP_HASH256 <Tx ID> OP_EQUAL |

Embodiments of the present disclosure further improve upon this injection by causing not just the injection of any serialized transaction, but by causing the injection of one or more serialized previous transactions (e.g., previous transactions 802A-02B) referenced in the inputs of the unlocking transaction 804. As described above in reference to FIG. 7, the set of unlocking transaction fields determined according to the SIGHASH type can be caused to be injected into the locking script via an unlocking script 806, and FIG. 9 illustrates which fields are included in the serialized transaction depending on the SIGHASH type specified.

Figure 9:
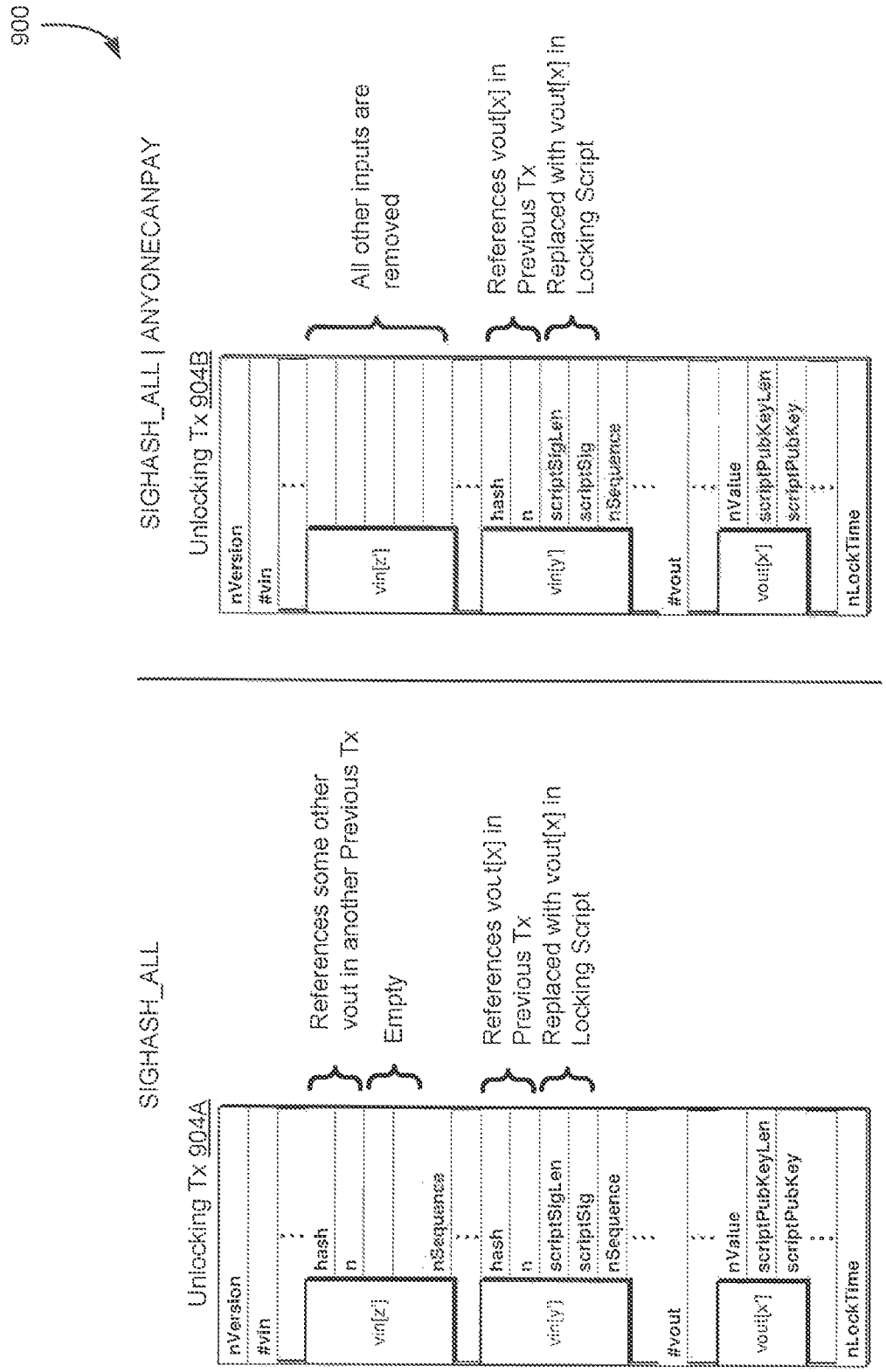
FIG. 9 illustrates an example of sets of fields available depending on signature hash type in accordance with an embodiment.

FIG. 9 illustrates an example 900 of the sets of fields that are available in a serialized transaction depending on the SIGHASH type specified. Note, however, that FIG. 9 is intended to be illustrative and, in various embodiments, there are more SIGHASH types than depicted in FIG. 9. As shown in FIG. 9, with different SIGHASH types, different sets of previous transaction IDs are included in the set of unlocking transaction fields determined according to the SIGHASH type (note that the "hash" field represents the transaction ID in big endian format). In some embodiments, the transaction ID of the previous transaction that embeds the locking script is always available regardless of which SIGHASH type is specified.

Thus, certain fields can be caused to be present in the set of unlocking transaction fields determined by constraining the SIGHASH type in the following manner: first, duplicate the SIGHASH type. Next, push the SIGHASH type onto the stack (e.g., SIGHASH_ALL). Lastly, call OP_EQUAL-VERIFY. As can be seen in FIG. 9, SIGHASH_ALL (as shown with unlocking transaction 904A) includes the hashes, which as noted represents the transaction IDs of previous transactions y and z. In contrast, SIGHASH_ALL+ANYONECANPAY (as shown with unlocking transaction 904B) includes only the hash of immediately preceding transaction y. In some embodiments, the unlocking transactions 904A-04B are similar to the unlocking blockchain transaction 204 of FIG. 3 that represents an attempt to reassociate at least a portion of a digital asset controlled by a previous transaction (e.g., transaction y and/or x). Extracting the transaction IDs can be accomplished by parsing the serialized transaction using substring operation codes until the desired field(s) are reached, which is illustrated in FIG. 10.

Figure 10:
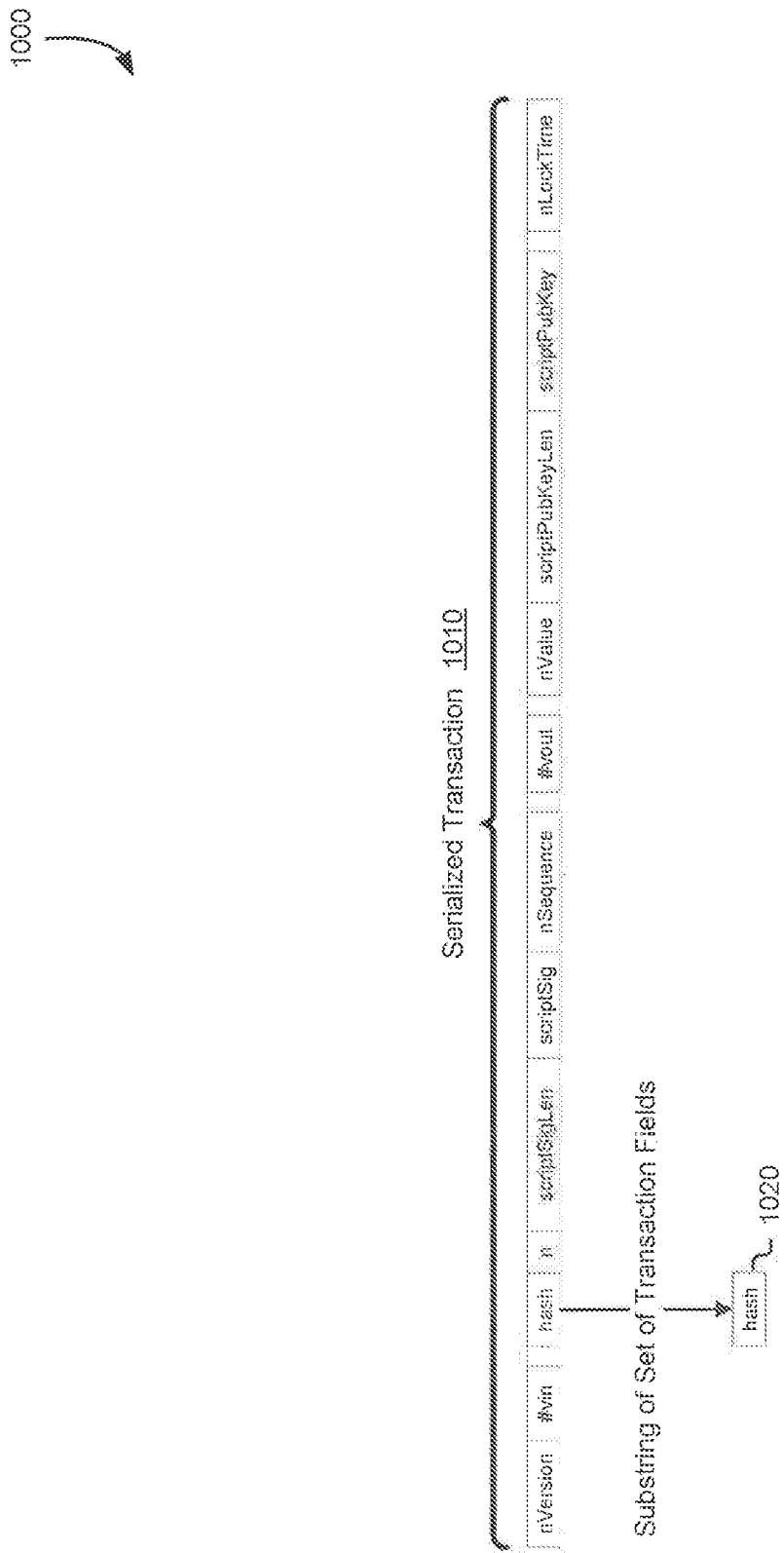
FIG. 10 illustrates an example of extracting a transaction identifier from a serialized transaction in accordance with an embodiment.

FIG. 10 illustrates an example 1000 of extracting a transaction ID in an embodiment of the present disclosure. Specifically, FIG. 10 illustrates that a hash 1020, which is comprised of the transaction ID in big endian format, is a substring of a serialized transaction 1010 that can be extracted by using a substring operation code within a script. In some embodiments, the serialized transaction 1010 is first parsed to identify the location of the hash 1020 before the transaction ID can be extracted because some fields (e.g., #vin, scriptSigLen, scriptSig, scriptPubKeyLen and scriptPubKey) are of a variable byte length. However, it is contemplated that in implementations where fields have fixed lengths, parsing may not be necessary.

Thus, in some embodiments, by building a locking script that causes the injection of a specific serialized previous transaction referenced in an unlocking transaction in the manner described in reference to FIG. 6, the previous transaction ID can be made accessible. For example, first the SIGHASH type constraint is determined, the transaction ID is extracted, and the serialized previous transaction is duplicated and checked against the transaction ID extracted from the unlocking transaction serialized set of fields (according to the SIGHASH type). Note that this process can be performed to cause injection of multiple different serialized previous transactions. As an example, Table 8 presents a script that causes injection of a previous transaction corresponding to input X of the unlocking transaction.

TABLE 8

| Unlocking Script | Locking Script |
|---|---|
| <Serialized Previous Tx (for Tx ID X)><br><SIGHASH Type><br><Serialized Set of Unlocking Tx Fields> | <X><br>// OP_PREVTXINJECTION Below<br>// Push <X> to Alt Stack<br>OP_TOALTSTACK<br>// Causes Injection of<br>Unlocking Tx (consumes SIGHASH Type)<br>OP_SWAP OP_OVER<br>OP_UNLOCKINGTXINJECTION<br>OP_VERIFY<br>// Extract Tx ID <X> from<br>Unlocking Tx<br>OP_FROMALTSTACK<br>OP_EXTRACTTXID<br>// Create Tx ID from<br>Serialize Previous Tx<br>OP_SWAP OP_HASH256<br>// Check the Tx IDs are the same<br>OP_EQUAL |

In the above script, OP_EXTRACTXID is an operation code/script that takes data containing the transaction ID and the transaction ID position as input and outputs of the extracted transaction ID. In the present disclosure, the above script may be referred to as OP_PREVTXINJECTION. Thus, references to OP_PREVTXINJECTION in embodiments of the present disclosure should be viewed as shorthand for the operations executed in the above script.

Note, however, that any entity that provides the SIGHASH type, set of unlocking transaction fields determined according to the SIGHASH type, and serialized previous transaction can obtain the transaction output. However, this becomes a useful feature as described in further detail below.

As another example, Table 9 presents scripts that cause injection of a previous transaction corresponding to input being signed.

TABLE 9

| Unlocking Script | Locking Script |
|---|---|
| <Serialized Previous Tx (for input being signed)><br><SIGHASH Type><br><Serialized Set of Unlocking Tx Fields> | // Save a copy of SIGHASH Type<br>OP_OVER OP_TOALTSTACK<br>// Only 1 Tx ID, which corresponds to Prev Tx of this Locking Script<br><0> OP_PREVTXINJECTION<br>OP_VERIFY<br>// Make sure SIGHASH Type is SIGHASH_X | ANYONECANPAY<br>OP_FROMALTSTACK <SIGHASH_ANYONECANPAY> OP_AND |

In the present disclosure, as with the script of Table 8, the above script in Table 8 may also be referred to as OP_SELFTXINJECTION. Thus, references to OP_SELFTXINJECTION in embodiments of the present disclosure should be viewed as shorthand for the operations executed in the above scripts.

Note too, that any entity that provides the SIGHASH type, set of unlocking transaction fields determined according to the SIGHASH type, and the serialized previous transaction can obtain the transaction output. However, this becomes a useful feature as described in further detail below. As noted above, in some examples, obtaining the transaction output refers to creating an unlocking transaction that references the transaction output and successfully validating the unlocking transaction.

Figure 11:
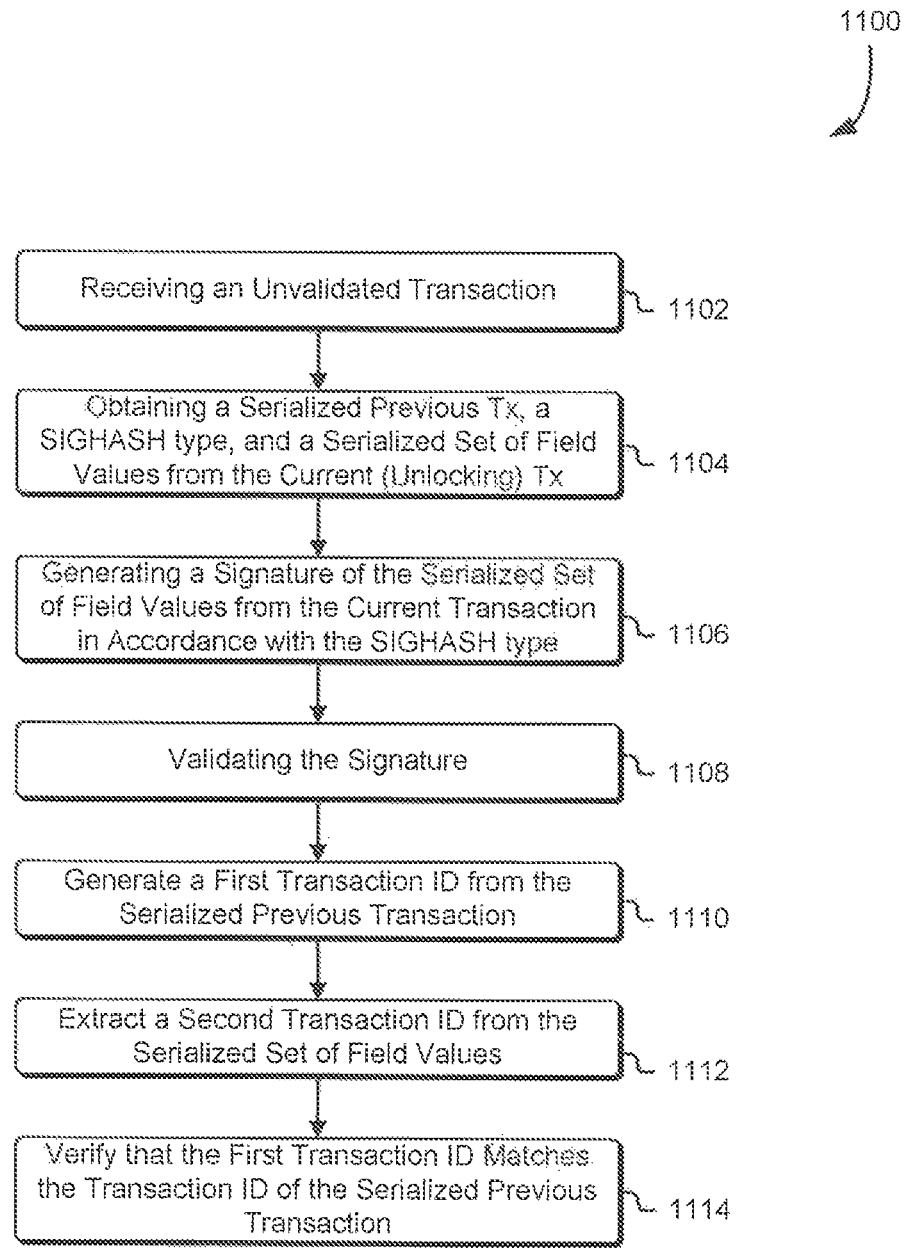
FIG. 11 is a flow diagram that illustrates an example of causing an injection of a serialized previous transaction in accordance with an embodiment.

FIG. 11 is a flow diagram illustrating an example of a process 1100 for causing an injection of a serialized previous transaction in accordance with various embodiments. Some or all of the process 1100 (or any other processes described, or variations and/or combinations of those processes) can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media).

For example, some or all of process 1100 can be performed by a validation node in a blockchain network, such as the example blockchain network 100 of FIG. 1. Such a validation node may be comprised of any suitable computing device (e.g., by a server in a data centre, by a client computing device, by multiple computing devices in a distributed system of a computing resource service provider, or by any suitable electronic client device such as the computing device 2600 of FIG. 26). The process 1100 includes a series of operations wherein the system performing the process 1100 executes an unlocking script and locking script of an unvalidated transaction in conjunction and, as a result, obtains a serialized previous transaction that corresponds to a transaction ID extracted from the unvalidated transaction.

In 1102, the system obtains an unvalidated transaction from an entity seeking to reassociate at least a portion of a digital asset. The unvalidated transaction includes a locking script and an unlocking script. The locking script and unlocking script may be similar to the locking scripts and unlocking scripts shown in Tables 8 and 9 above. That is, the locking script includes a set of instructions that take as input value stored in the main and alternate stacks, such as by the unlocking script. Execution of the set of instructions, if evaluated to TRUE, successfully validates the unvalidated transaction. Therefore the unlocking script is executed prior to the locking script, setting up values in the main and alternate stacks to be used by the locking script. The unlocking script of the unvalidated transaction in the embodiment of FIG. 11 includes a serialized previous transaction, a SIGHASH type, and a serialized set of unlocking transaction fields.

As a result of execution of unlocking script followed by the locking script, in 1104, system obtains the serialized previous transaction, the SIGHASH type, and the serialized set of unlocking transaction fields included in the unlocking script. In 1106, the system a signature based on the serialized set of field values of the unvalidated transaction based on the SIGHASH. Note that the SIGHASH type affects which fields are used in the signature generation, and the SIGHASH desired may depend on the particular previous transaction sought. For example, Table 8, which illustrates a locking script and unlocking script for extracting a previous transaction, but not necessarily a previous transaction that contains the same locking script, utilizes a SIGHASH type of SIGHASH_ALL. As illustrated in FIG. 9, the SIGHASH_ALL type enables the retrieval of inputs of other previous transactions of the unlocking transaction. In contrast, Table 9, which illustrates a locking script and unlocking script for extracting the previous transaction having the same locking script (i.e., the previous transaction corresponding to input being signed), utilizes a SIGHASH type of SIGHASH_ALL|ANYONECANPAY. As illustrated in FIG. 9, the SIGHASH type of SIGHASH_ALL|ANYONECAN-PAY removes inputs of other previous transactions other than previous transaction having the inputs being signed.

In 1108, the system validates the signature previously generated, and then, in 1110, by performing a double SHA-256 of the obtained serialized previous transaction, produces a value that should match the transaction ID of the unlocking transaction (i.e., the serialized set of field values). Using substring operation codes, in 1112, the system extracts the transaction ID of the serialized set of field values, and in 1114 the system determines whether the transaction ID produced by the double SHA-256 of the serialized previous transaction matches the transaction ID of the serialized set of field values. Note that, in various embodiments, a match does not necessarily require equality. For example, two values may match if they are not equal, but mathematically equivalent. As another example, two values may match if they correspond to a common object (e.g. value) or are in some predetermined way complementary and/or they satisfy one or more matching criteria. Generally, any way of determining whether there is a match may be used. Note also that one or more of the operations performed in 1102-14 may be performed in various orders and combinations, including in parallel.

Figure 12:
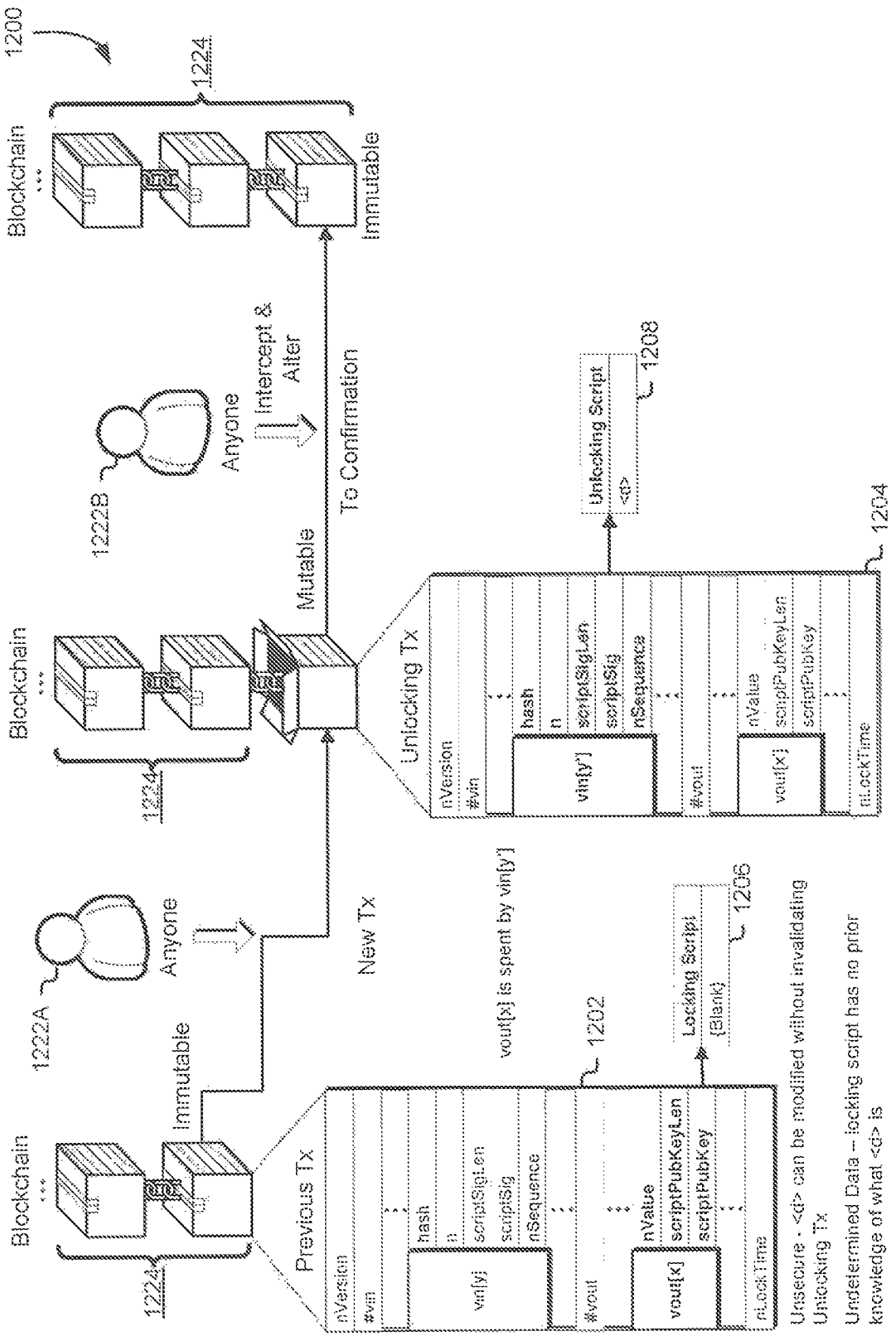
FIG. 12 illustrates an example of an unsecure provision of undetermined data from an undetermined source in accordance with an embodiment.

FIG. 12 illustrates an example 1200 illustrating a problem associated with locking scripts that is solved by an embodiment of the present disclosure. That is, the example 1200 depicted in FIG. 12, illustrates an issue presented by providing undetermined data to a locking script. In some examples, the term "undetermined data" refers to data, provided through an unlocking script that unlocks a locking script, of which a node executing the locking script has no prior indication.

In some embodiments, the previous transaction 1202 is similar to the previous transaction of 302 of FIG. 3. Likewise, in some embodiments, the unlocking transaction 1204 is a similar to 304. In some embodiments, the blockchain 1224 is comprised of a set of blocks of transactions in a peer-to-peer, electronic ledger. In embodiments, each block of the blockchain 1224 comprises a hash of the prior block so that the blocks become linked (i.e., "chained") together to create a permanent, immutable record of all validated transactions in the blockchain.

In some embodiments, the undetermined source 1222A may be an entity attempting to obtain the UTXO of the previous transaction 1202. The undetermined source 12228 may be the same as the undetermined source 1222A or may be a different entity from the undetermined source 1222A. In either case, the node executing the locking script does not have prior knowledge of the undetermined sources 1222A-128 prior to execution of the locking script.

In the example 1200, the locking script 1206 is blank, allowing it to accept data without prior knowledge of the source of the data or what the data will be. The data ("<d>") is determined at the time that the unlocking transaction 1204 is created (e.g., by undetermined source 1222A). However, because the unlocking transaction 1204 is susceptible to alteration (in other words, it is mutable), such as by undetermined source 1222B before it is confirmed on the blockchain 1224 (at which time the unlocking transaction 1204 becomes immutable), such a locking script presents security concerns.

Figure 13:
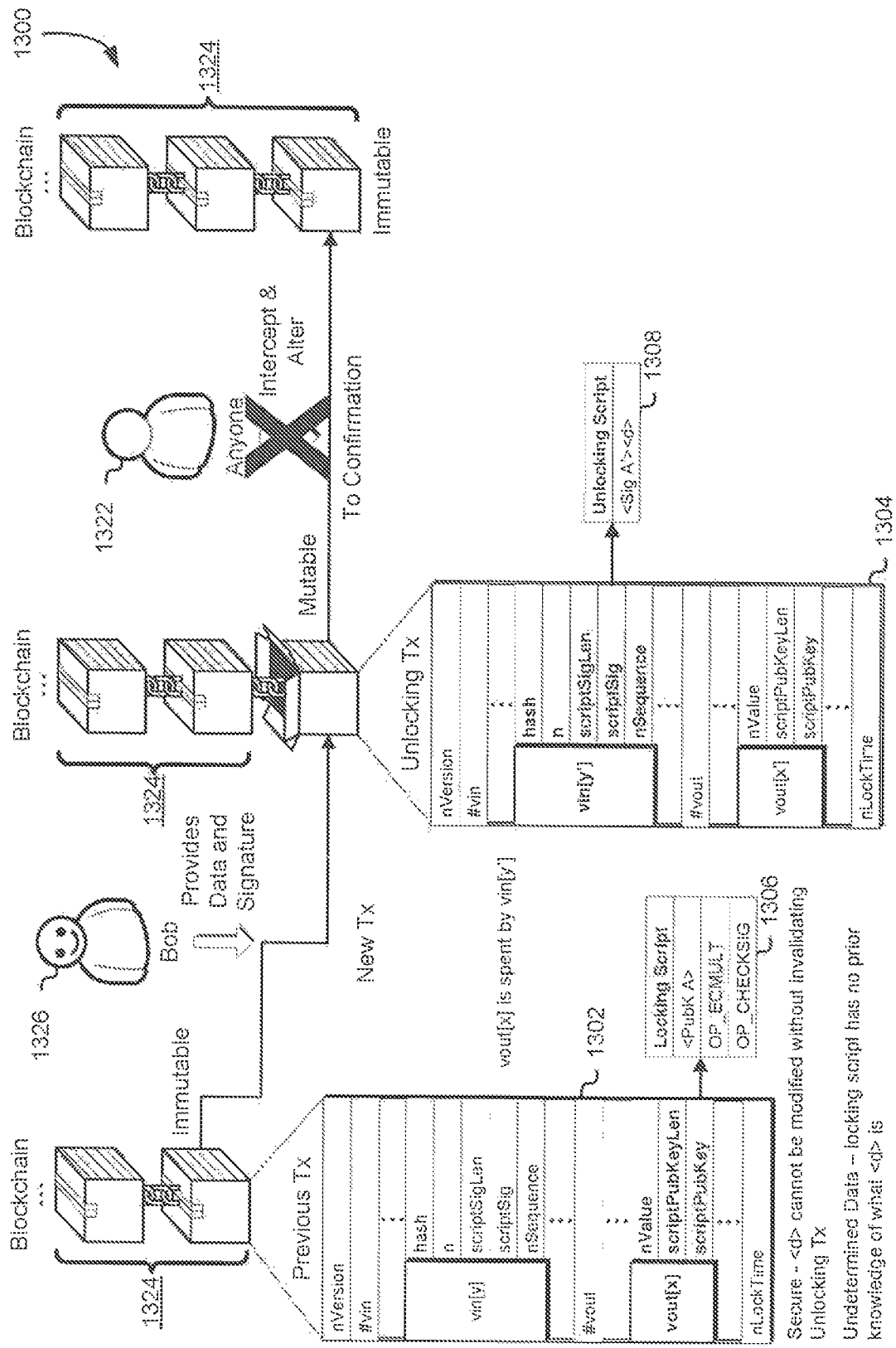
FIG. 13 illustrates an example of secure provision of undetermined data from a determined source in accordance with an embodiment.

FIG. 13 illustrates an example 1300 illustrating how undetermined data from a determined source can be securely provisioned into a locking script 1306 in an embodiment of the present disclosure. That is, the example 1300 depicted in FIG. 13, illustrates an issue presented in a situation where the node executing the locking script 1306 has prior knowledge of the source (e.g., determined source 1326) that will provide the data but no prior knowledge as to what the data will be. In some embodiments, the previous transaction 1302 is similar to the previous transaction of 302 of FIG. 3. Likewise, in some embodiments, the unlocking transaction 1304 is a similar to 304. In some embodiments, the blockchain 1324 is similar to the blockchain 1224 of FIG. 12.

In the example 1300, the locking script 1306 is configured to cause a validating node executing the locking script 1306 to check whether data provided in the unlocking script 1308 has been provided by a determined data source. That is, a private key can be modified based on data (d) to produce a modified private key (a') by performing multiplying by the data in the manner of:

$$a'=a \times d$$

The public key (A) counterpart to the unmodified private key Can similarly be modified by performing elliptic Curve point multiplication to produce a modified public key (A') in the manner of:

$$A'=d \times A$$

Consequently, the locking script 1306 can be configured to cause the validating node to evaluate a signature that was signed using a private key that was modified based on the data using the public key (A) for the data source. More particularly, a signature checking operation code may be included in the locking script 1306, which checks whether the signature (Sig A') signed using the modified private key corresponds to the modified public key and is, therefore, a valid signature. The check may be performed, for example, by, using the OP_CHECKSIG operation code.

As can be seen in the example 1300, execution of the locking script 1306 causes the node to place the public key on the stack and, performs an elliptic curve point multiplication operation (OP_ECMULT) between the public key and data placed in the stack by prior execution of the unlocking script 1308. The data, then, can be determined at the time the unlocking transaction is created by the source specified in the locking script (e.g., determined source 1326). Thus, the locking script has knowledge of the source providing the data, but no knowledge of what the data will be. Further execution of the locking script 1306 causes validates result (e.g., OP_CHECKSIG returns TRUE if the values match) against the signature, also placed on the stack by prior execution of the unlocking script 1308, of the data signed using the modified private key. This approach is secure because alterations to unlocking transaction 1304 will invalidate it. However, the source (the determined source 1326) of the data must be specified. A signature verification algorithm in ECDSA involves checking whether a signature, a public key, and a message have a particular mathematical relationship. The message can be any data. In Bitcoin, the verification operation code, OP_CHECKSIG, prevents any arbitrary data from being the message by limiting the message to being the serialized transaction while still allowing verification that the message is from a specific source. Embodiments of the present disclosure provide an alternate solution to this limitation.

In some embodiments, the undetermined source 1322 is an entity that is unable to alter the data. In some embodiments, the determined source 1326 is a known entity at the time the locking script 1306 is generated such that the locking script 1306 includes the public key of the determined source 1326.

Figure 14:
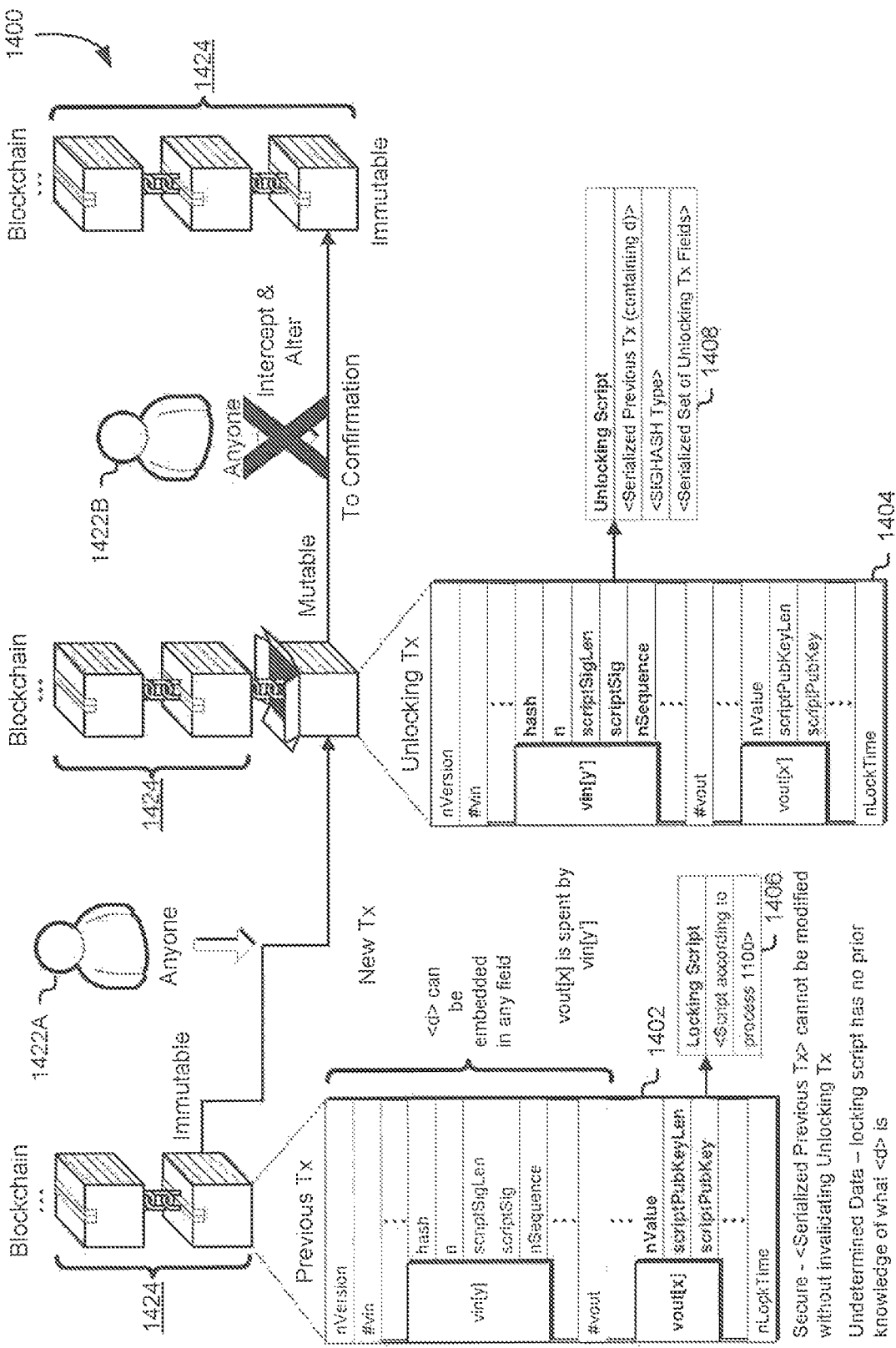
FIG. 14 illustrates an example of secure provision of undetermined data from an undetermined source into a locking script in accordance with an embodiment.

FIG. 14 illustrates an example 1400 demonstrating how undetermined data can be securely provisioned from an undetermined source into a locking script 1406. Specifically, FIG. 14 depicts an unlocking transaction 1404 that executes a locking script based on the locking scripts described in conjunction with the process 1100 of FIG. 11. In some embodiments, the previous transaction 1402 is similar to the previous transaction of 302 of FIG. 3, Likewise, in some embodiments, the unlocking transaction 1404 is a similar to 304. In some embodiments, the blockchain 1424 is similar to the blockchain 1224 of FIG. 12.

The example 1400 differs from the example 1300 of FIG. 13 in that the data in the example 1400 can be undetermined at the time the locking script 1406 is created. The data in question will be embedded somewhere in the previous transaction 1402, and therefore can be extracted by parsing the serialized previous transaction as described above in relation to FIGS. 8-11 above.

In this manner, the node executing the locking script 1406 need not have prior knowledge of the entity providing the serialized previous transaction, nor does the node need have prior knowledge of the previous transaction 1402. Furthermore, the previous transaction 1402, being committed to the blockchain 1424, is already immutable by the time the unlocking transaction 1404 is created, and is thereby secure from alteration without causing the unlocking transaction 1404 to be invalid. However, although the node executing the locking script 1406 has no prior knowledge of the data, the data is determined at the time that the previous transaction 1402 is created.

In some embodiments, the locking script 1406 is a script in accordance with the scripts described concerning the process 1100 of FIG. 11. In some embodiments, the unlocking script 1408 is similar to the unlocking scripts described in conjunction with FIGS. 8-11. For example, as can be seen in the example 1400, the unlocking script 1408 includes at least one serialized previous transaction, a SIGHASH type, and a serialized set of unlocking transaction fields of the unlocking transaction 1404.

The undetermined source 1422A is the entity that supplies the data encoded in the serialized previous transaction. The undetermined source 1422B is an entity attempting to intercept and alter the unlocking transaction 1404. In some embodiments, the undetermined sources 1422A-22B may be the same or different entities. As can be seen in the example 1400, the identity of undetermined source 1422A does not need to be known at the time the locking script 1406 is created. Furthermore, the data also does not need to be known at the time the locking script 1406 is created. Yet the undetermined source 1422B is still prevented from altering the data.

In embodiments, various fields of the previous transaction 1402, other than the locking script being executed by the unlocking transaction 1404, can be used to store the secure, undetermined data, including the amount of the digital asset in the output of the previous transaction 1402 or metadata encoded in a locking script of another output of the previous transaction 1402. Thus, that the embodiment of example 1400 allows virtually any entity to embed data in previous transaction, pay to some variation of the locking script 1406, and be assured that no other entity can modify that data. This feature is useful in further embodiments described below.

Figure 15:
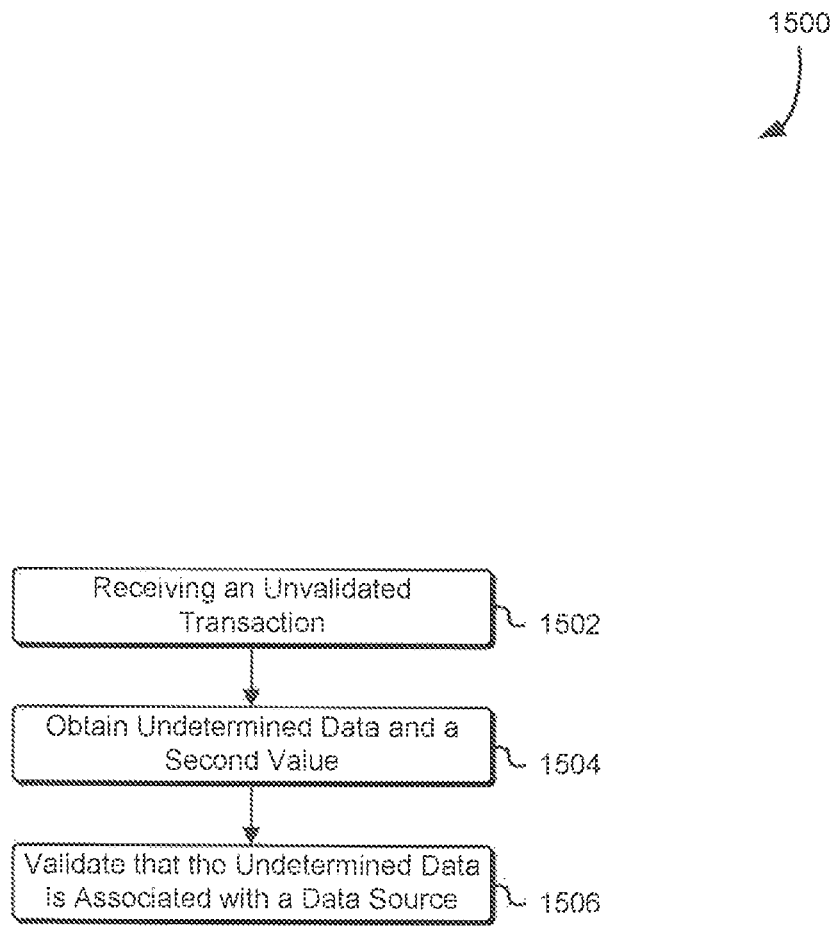
FIG. 15 is a flow diagram that illustrates an example of secure provisioning of undetermined data into a locking script in accordance with an embodiment.

FIG. 15 is a flow diagram illustrating an example of a process 1500 for securely provisioning undetermined data in accordance with various embodiments. Some or all of the process 1500 (or any other processes described, or variations and/or combinations of those processes) can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media).

For example, some or all of process 1500 can be performed by a validation node in a blockchain network, such as the example blockchain network 100 of FIG. 1. Such a validation node may be comprised of any suitable computing device (e.g., by a server in a data centre, by a client computing device, by multiple computing devices in a distributed system of a computing resource service provider, or by any suitable electronic client device such as the computing device 2600 of FIG. 26). The process 1500 includes a series of operations wherein an unvalidated transaction is received, undetermined data and a second value is obtained as a result of execution of an unlocking script, and the undetermined data is validated as being associated with a trusted data source.

In 1502, the system obtains an unvalidated transaction from an entity seeking to reassociate at least a portion of a digital asset. The unvalidated transaction includes a locking script and an unlocking script. The locking script and unlocking script may be similar to the locking scripts and unlocking scripts shown in FIGS. 13 and 14. Execution of the set of instructions, if evaluated to TRUE, successfully validates the unvalidated transaction. Therefore the unlocking script is executed prior to the locking script, setting up values in the main and alternate stacks to be used by the locking script.

The unlocking script of the unvalidated transaction in the embodiment of FIG. 13 includes undetermined data ("<d>") and a signature of the undetermined data ("<SigA'>") signed using a modified private key that was modified by multiplying the private key of a determined data source (e.g., "Bob") by the value of the undetermined data using elliptic curve point multiplication. Thus, the private key would be a point on the elliptic curve. Note that, as mentioned above, the term "undetermined" in this context refers to that the data is not specified or otherwise constrained by the locking script itself. In a similar manner, an "undetermined data source" is a data source whose identity is not specified or constrained by the locking script, whereas a "determined data source" constrains the identity to be a particular data source (e.g., by including the public key of the data source) within the locking script. The unlocking script of the unvalidated transaction in the embodiment of FIG. 14 includes the undetermined data of the serialized previous transaction, a SIGHASH type, and a serialized set of the unlocking transaction fields. In this manner, because the data source is the serialized previous transaction, the data source need not be specified or constrained by the locking script itself.

As a result of execution of the unlocking script followed by the locking script, in 1504, the system obtains the undetermined data and a value usable to validate the data with the determined or undetermined source associated with the data (e.g., signature signed with a modified private key or serialized set of unlocking transaction fields from which a transaction identifier can be extracted).

In 1506, the system validates the data. For example, in the embodiment of FIG. 13, the system validates that the data is associated with a public key included in the locking script by modifying the public key with the data using elliptic curve point multiplication (as described above) and validating that the modified public key is associated with the signature generated using a corresponding private key that was itself modified using elliptic curve point multiplication. As another example, in the embodiment of FIG. 14, the system validates that the data corresponds to a particular previous transaction by determining whether a hash of the serialized previous transaction matches a transaction ID extracted from the serialized set of unlocking transaction fields in the manner of process 1100 of FIG. 11. Note that one or more of the operations performed in 1502-06 may be performed in various orders and combinations, including in parallel.

Figure 16:
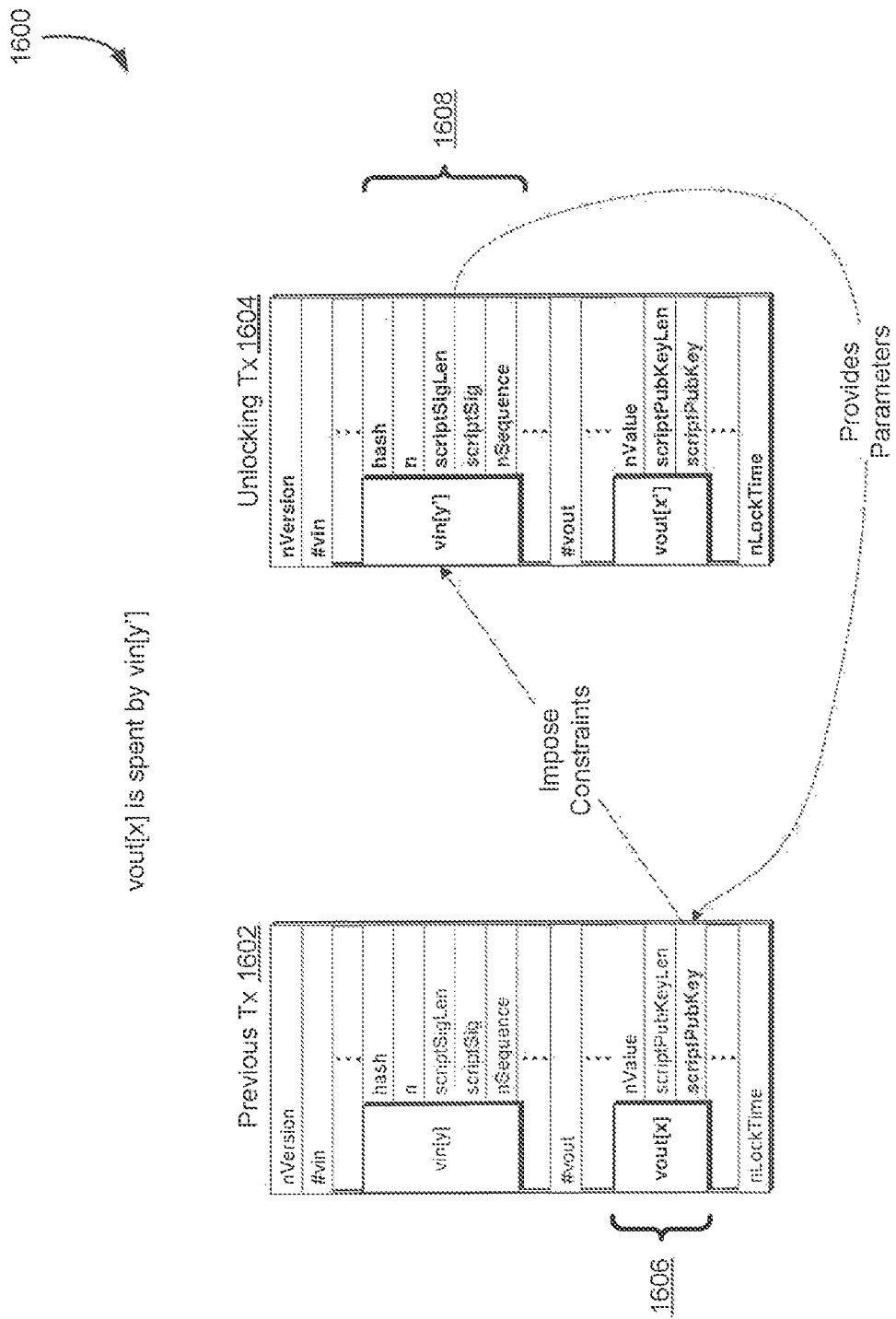
FIG. 16 illustrates an example of a parameterized smart contract in accordance with an embodiment.

FIG. 16 illustrates an example parameterizable smart contract 1600 of an embodiment of the present disclosure. Specifically, FIG. 16 depicts a previous transaction 1602 with a locking script 1606 that imposes constraints on an unlocking script 1608 of an unlocking transaction 1604. The embodiment depicted in FIG. 16 can be understood by recalling that the present disclosure has described how, in the descriptions of FIGS. 3-6, a set of unlocking transaction fields determined according to the SIGHASH type can be caused to be injected into the locking script 1606. Further recall that the descriptions of FIGS. 7-11, the present disclosure described how the set of unlocking transaction fields determined according to the SIGHASH type can be parsed using a substring operation code to extract a transaction ID before applying a constraint to cause a serialized previous transaction to be injected into the locking script 1606. This process can be extended to work any field in the set of unlocking transaction fields.

Note that the locking scripts described in the context of FIGS. 6 and 11 do not place a restriction on the particular entity that creates the unlocking transaction. For example, the locking script does not require proof that the particular entity has access to a secret (e.g., private key, value that produces a certain hash, etc.). The embodiment of FIG. 16 applies this concept to be undiscriminating regarding the particular entity that creates the unlocking transaction, but imposes certain constraints on how the UTXO can be claimed. In this manner, the embodiment of FIG. 16 is executed automatically and is self-enforcing). In other words, if the conditions of the smart contract are not met (i.e., noncompliance with the specified constraints), the contract will not execute because validation will fail.

In some embodiments, a smart contract in the locking script can be made interactive by putting constraints (e.g., parameters) on the input of the unlocking transaction 1604 (e.g., requiring an input from "Alice"). Because the unlocking script 1608 is the source of input for the locking script 1606, in embodiments a smart contract in the locking script 1606 can be parameterized using secure, undetermined data in the unlocking script 1608. In embodiments, the parameterized data undetermined and secured in the manner described in conjunction with FIGS. 13-15 to protect the smart contract from alteration. In embodiments, the parameterized data is undetermined.

The present disclosure described two methods for providing secure, undetermined data to a locking script (e.g., a smart contract). The first method is that the secure, undetermined data can be obtained from a determined source as described in the context of FIGS. 13 and 15. The second method is that secure, undetermined data can be obtained from an undetermined source (e.g., a previous transaction) as described in the context of FIGS. 14-15. In embodiments using the first method, the parameters would be determined by the entity that creates the unlocking transaction and would be set at creation of the unlocking transaction is created (e.g., in the unlocking script 1608). In embodiments using the second method, the parameters would be determined by the entity that created the previous transaction and would be set at creation of the previous transaction (i.e., embedded in the serialized previous transaction). Note too that, in embodiments, the first and second methods may be combined such that one or more parameters can be embedded in a previous transaction and one or more other parameters can be embedded in the unlocking script of the unlocking transaction.

The following example is presented to illustrate how a smart contract can be created using these methods. In the example, a smart contract is created for or by Alice to forward 70% of her income to her savings and 30% of her income to her investment manager, Bob. Her savings account is associated with a cryptographic public key A (PubK A) and her account with Bob is associated with a cryptographic public key B (PubK B). Alice's employer implements this smart contract, which, on payday, causes in Alice's income to be distributed in the manner described above. Consequently, Alice's income is automatically separated in the way she wants.

In the example, the parameter is the amount of a digital asset transferred as a result of execution of the smart contract. Execution of the smart contract will cause the parameter to be extracted from the previous transaction 1602 before determining the constraints on the output of the unlocking transaction 1604 according to the criteria above. Table 10 presents an example unlocking and locking script to implement the above example:

TABLE 10

| Unlocking Script | Locking Script |
| --- | --- |
| <Serialized Previous Tx> SIGHASH Type> <Serialized Set of Unlocking Tx Fields> | // Check Unlocking Tx Output 0 Amount is 70% of Previous Tx Output 0 Amount<br>// Deal with Unlocking Tx OP_DUP Script to Extract Unlocking Tx Output 0 Amount><br>// Deal with Previous Tx <3> OP_ROLL <Script to Extract Previous Tx Output 0 Amount><br>// Scale Previous Tx Amount by 70% and Perform Equality Check<br><70> OP_MUL <100> OP_DIV OP_EQUALVERIFY<br>// Check Unlocking Tx Output 0 and 1 Amount is Equal to Previous Tx Output 0 Amount<br>// Deal with Unlocking Tx OP_DUP <Script to Extract Unlocking Tx Output 0 Amount> OP_OVER <Script to Extract Unlocking Tx Output 1 Amount> OP_ADD<br>// Deal with Previous Tx <3> OP_ROLL <Script to Extract Previous Tx Output 0 Amount><br>// Equal Verify OP_EQUALVERIFY<br>// CHECK OUTPUT DESTINATIONS<br>// Check Unlocking Tx Output 0 Locking Script<br>OP_DUP <Script to Extract Unlocking Tx Output 0 Locking Script> <P2PK Alice> OP_EQUALVERIFY<br>// Check Unlocking Tx Output 1 Locking Script<br>OP_DUP <Script to Extract Unlocking Tx Output 1 Locking Script> <P2PK Bob> OP_EQUALVERIFY |

TABLE 10-continued

| Unlocking Script | Locking Script |
| --- | --- |
| | // Check that Previous Tx, SIGHASH Type, and Unlocking Tx have been injected OP_SELFTXINJECTION |

Figure 17:
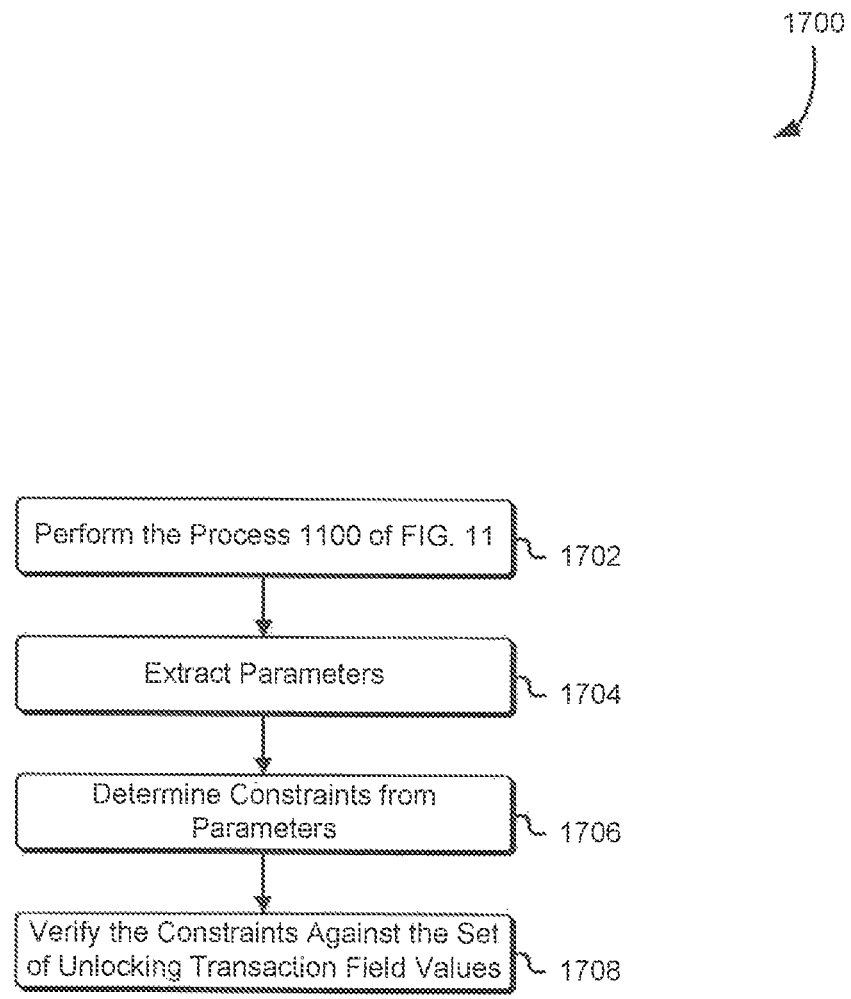
FIG. 17 is a flow diagram that illustrates an example of execution of a parameterized smart contract in accordance with an embodiment.

FIG. 17 is a flow diagram illustrating an example of a process 1700 for implementing a parameterized smart contract in accordance with various embodiments. Some or all of the process 1700 (or any other processes described, or variations and/or combinations of those processes) can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media).

For example, some or all of process 1700 can be performed by a validation node in a blockchain network, such as the example blockchain network 100 of FIG. 1. Such a validation node may be comprised of any suitable computing device (e.g., by a server in a data centre, by a client computing device, by multiple computing devices in a distributed system of a computing resource service provider, or by any suitable electronic client device such as the computing device 2600 of FIG. 26). The process 1700 includes a series of operations wherein constraints are extracted from parameters embedded in secure, undetermined data.

In 1702, the system executes a script that causes injection of a serialized previous transaction (e.g., serialized fields values of the previous transaction 1602 of FIG. 16), a SIGHASH type, and a set of unlocking transaction fields (e.g., field values of the unlocking transaction 1604) determined according to the SIGHASH type. The script may be a variation of the scripts from Tables 8 or 9. Note that the process 1100 of FIG. 11 may not be required in its entirety for the parameterizable smart contracts of FIGS. 16 and 17, because a serialized previous transaction may not be required if a parameter from an undetermined source is not needed.

In 1704, the system extracts the parameters in a manner that depends on whether the source of the parameters is an undetermined or determined source. For example, extracting the parameters from data of a determined source can be performed by extracting the parameters from the unlocking script 1608 in the manner described in conjunction with FIG. 13. As another example, extracting the parameters from data of an undetermined source can be performed by extracting the parameters from a serialized previous transaction in the manner described in conjunction with FIG. 14. As still another example, if some parameters are embedded in data of an undetermined source and some parameters are received from a determined source, a script can be written to combine the operations of FIGS. 13 and 14 to extract parameters from data coming from both undetermined and determined sources.

In 1706, the system derives constraints from the parameters. For example, in the example scripts of Table 10, the parameter is the amount paid to the smart contract, and deriving the constraints includes determining the amounts (e.g., 70% and 30%) to pay forward to pay-to-public-key (P2PK) addresses of Alice and Bob. It is contemplated, however, that the parameters and constraints derivable from the parameters can be numerous and varied beyond the examples given above.

In 1708, the system verifies the constraints against the set of unlocking transaction field values determined according to the SIGHASH type. That is, the system verifies that a relevant subset of unlocking transaction meets the constraints. If the relevant subset of the unlocking transaction meets the constraints, the unlocking transaction is confirmed as valid, otherwise, if the relevant subset of the unlocking transaction does not meet the constraints, the unlocking transaction is considered invalid. Note that one or more of the operations performed in 1702-08 may be performed in various orders and combinations, including in parallel.

Figure 18:
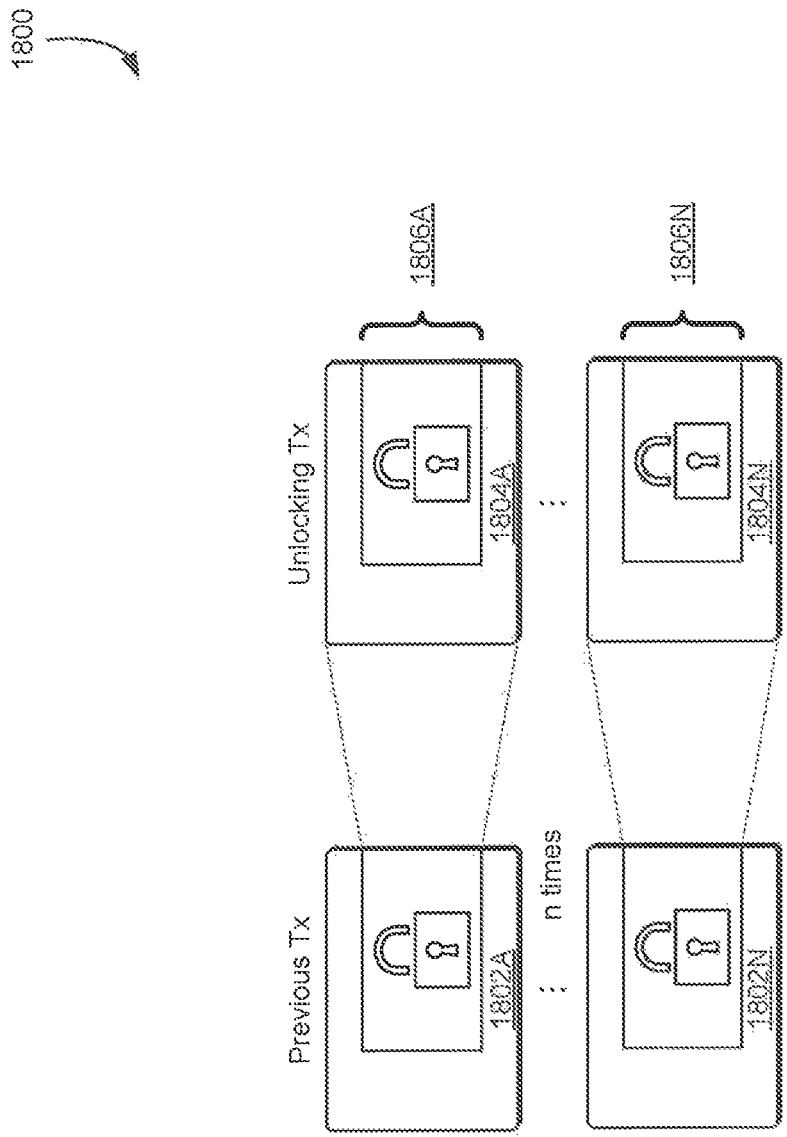
FIG. 18 illustrates an example of a problem of smart contract duplication that is solved by an embodiment.

FIG. 18 illustrates an example 1800 of an issue associated with repeating smart contracts that is solved by an embodiment of the present disclosure. That is, in order to create a transaction that repeats a known number of times (e.g., five times), the known number of unlocking transactions could be created in advance. While this could be manageable for a small number of transactions, for contracts with many repeated transactions, generating all of the unlocking transactions 1804A-04N in advance could become cumbersome and the scripts 1806A-06N could become quite large. In an example, Alice has an amount of a digital asset (e.g., Bitcoins) with value that can be exchanged for goods or services. Alice has allocated this amount to be used by her son Bob to pay for his school lunch every day. The example 1800 of FIG. 18 shows that Alice could create unlocking transactions 1804A-04N for each of Bob's individual lunch transactions in advance. However, as shown in FIG. 19, the present disclosure contemplates an alternate solution for Alice.

Figure 19:
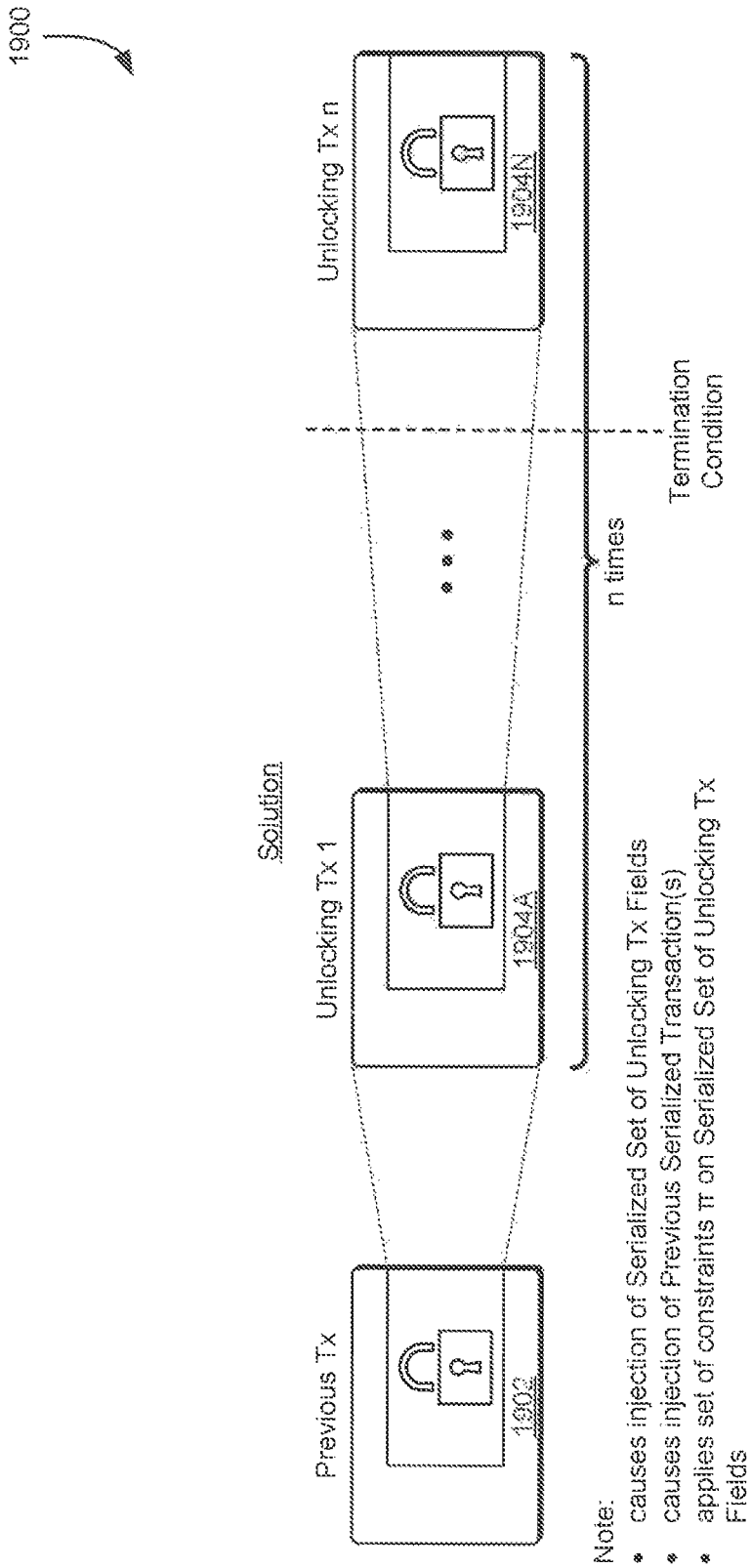
FIG. 19 illustrates an example of a solution to a problem of smart contract duplication in accordance with an embodiment.

FIG. 19 illustrates an example 1900 of a self-replicating smart contract of an embodiment of the present disclosure. As illustrated in FIG. 19, rather than creating a predetermined certain number of unlocking transactions to achieve the repeating contract, a self-replicating smart contract 1904 with a termination condition, based on the parameterizable smart contracts described in conjunction with FIGS. 16-17, can be created. In this manner, in the above example, Alice need only create one unlocking transaction to deplete from an initial amount of a digital asset in a previous transaction 1902. The unlocking transaction 1904A includes a script that causes the unlocking transaction 1904A to replicate itself into a next unlocking transaction. The script includes a termination condition that causes the unlocking transaction 1904N to stop replicating after the termination condition is fulfilled (e.g., after n occurrences).

Figure 20:
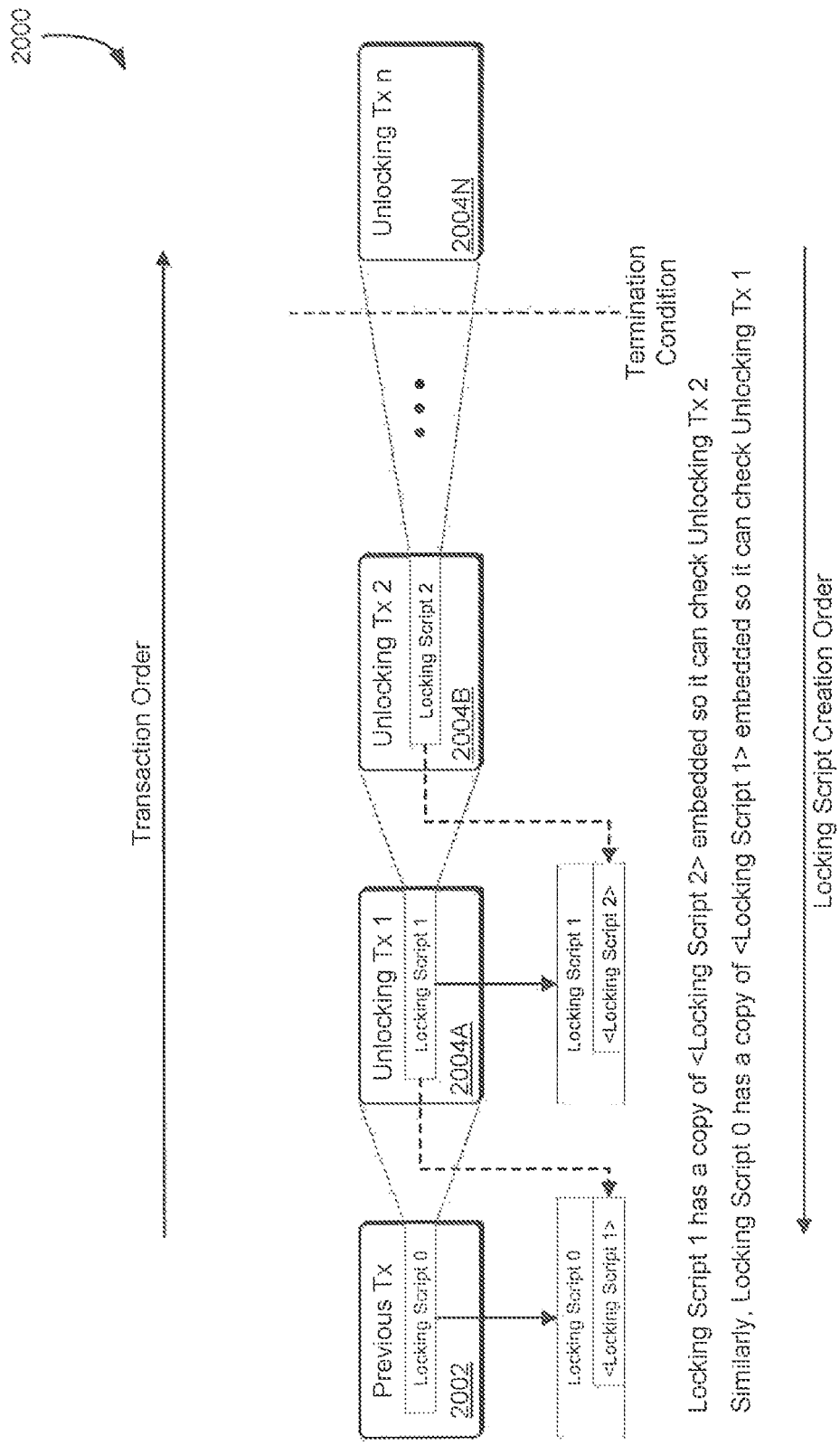
FIG. 20 illustrates an another example of a problem of smart contract duplication that is solved in accordance with an embodiment.

In one possible implementation, to create a chain of transactions for a contract, the future transactions are created in advance, and the locking script of each transaction embeds the locking script of the successive transaction, as shown in FIG. 20. However, for a self-replicating unlocking transaction to verify that the constraints of the unlocking transaction are unmodified, the locking script (e.g., smart contract) of each previous transaction would need to securely verify that it matches the locking script in the unlocking transaction.

FIG. 20 illustrates an example 2000 of an issue with repeating transactions solved by an embodiment of the present disclosure. That is, the locking script (locking script 0) of the previous transaction 2002 incorporates the locking script (locking script 1) of the first unlocking transaction 2004A, which itself incorporates the locking script (locking script 2) of the second unlocking transaction 2004B, and so on until the final unlocking transaction 2004N. If completely unrolled, it becomes apparent that locking script 0 is not the same as locking script 1, which is not the same as locking script 2, and so on. Thus, example 2000 cannot be said to be self-replicating, as the locking scripts are not the same. This problem can be understood as one that stems from self-referencing. That is, the locking script would need to embed a copy of itself, thereby becoming an unending and unravelable loop. Consequently, the locking script would be undeterminable. The example 2000 fixes the number of times (n) that the loop can unravel before assigning a value to the nth locking script, which then allows the n−1 locking script to embed the n locking script, which the allows the n−2 locking script to embed the n−1 locking script, and so on. However, this results in n different locking scripts.

Figure 21:
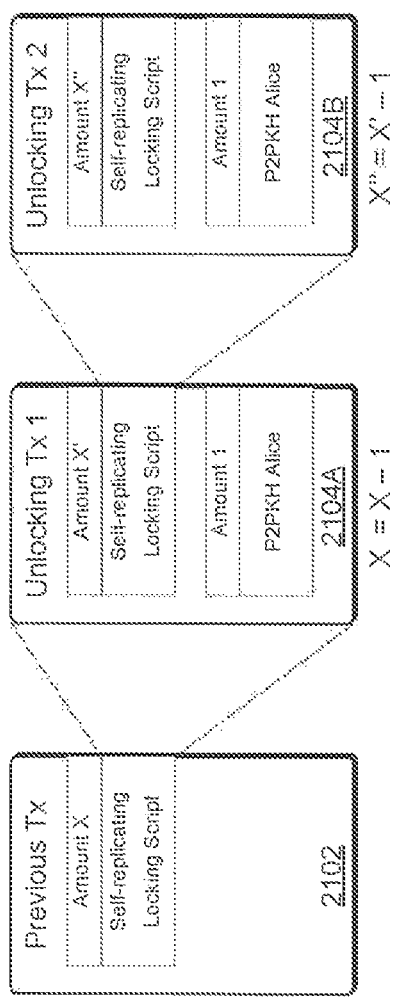
FIG. 21 illustrates an example of a self-replicating smart contract in accordance with an embodiment.

FIG. 21 illustrates an example 2100 of a solution to problems with naïve implementations of self-replicating transactions. Specifically, FIG. 21 depicts a duplicating smart contract that reduces a digital asset amount sent to itself by one unit each time and also pays 1 unit of the digital asset to Alice. That is, a previous transaction 2102 holds the initial amount X. The first unlocking transaction 2104A pays 1 unit of the digital asset to the pay-to-public-key-hash (P2PKH) address belonging to Alice, outputs the new total ($X'=X-1$) and replicates itself to a second unlocking transaction 2104B. In some examples, a P2PK or P2PKH can be used as an address to direct transfer of a digital asset to an entity associated with the respective public key. The second unlocking transaction 2104B again pays 1 unit of the digital asset to Alice, outputs the new total ($X''=X'-1$) and replicates itself again.

Thus, it can be seen that as the process continues regardless of the initial amount X, an unlocking transaction will eventually be generated to output an unredeemable amount of a digital asset (e.g., zero). This can be intuitively understood by observing that each subsequent unlocking transaction will have a smaller amount of digital asset than its previous transaction, even without deducting the minimum transaction fee deducted in various blockchain protocols. Consequently, the amount output will converge towards zero, at which point processing the transaction becomes pointless. However, embodiments of the present disclosure include a solution to this problem by implementing a termination condition to avoid such unredeemable unlocking transactions.

Furthermore, in embodiments, a solution to the problem illustrated in FIG. 20 is to have locking script 1 receive first data (e.g., unlocking transaction data) and second data (e.g., previous transaction data), which both embed a locking script. In these embodiments, locking script 1 verifies that the locking script from the first data and second data match. Then, if locking script 1 verifies that the second data (previous transaction data) embeds locking script 1, it is verified that first data also embeds locking script 1.

A basic outline of such a script is found in Table 11 below:

TABLE 11

| Unlocking Script | Locking Script |
|---|---|
| <Serialized Previous Tx> | <Script to Check Termination Condition> |
| <SIGHASH Type> | // If not terminated |
| <Set of Unlocking Tx Fields > | OP_NOTIF |
| | // Duplicate and Extract Locking Script from Unlocking Tx |
| | OP_DUP <Script to Extract |

TABLE 11-continued

| Unlocking Script | Locking Script |
| --- | --- |
| | Locking Script> |
| | // Duplicate and Extract Locking Script from Previous Tx |
| | <3> OP_ROLL <Script to Extract Locking Script> |
| | // Check the Locking Scripts are the same |
| | OP_EQUALVERIFY |
| | OP_ENDIF |
| | // Checking Injection of Previous Tx corresponding to Locking Script |
| | OP_SELFTXINJECTION |

As can be seen in the script above, the locking script of the previous transaction 2102, which is the locking script currently running that will unlock the UTXO, is verified against the locking script of the first unlocking transaction 2104A, which will be redeemed in the future when the current unlocking transaction is a previous transaction to another unlocking transaction (e.g., the second unlocking transaction 2104B). Thus, rather than creating a different unlocking transaction for each transaction, as shown in FIGS. 18 and 20, the script instead enforces that each locking script must be identical. If the locking script of the previous transaction 2102 is identical to the locking script that the second unlocking transaction 2104B will attempt to unlock (e.g., the first unlocking transaction 2104A), the locking scripts are assured to be genuine.

In embodiments, the termination condition avoids a situation where a previous transaction has insufficient funds but the locking script still validates; i.e., an unredeemable transaction. For example, a termination condition could be implemented to verify that there is enough of the digital asset to carry out the next transaction, otherwise terminate the validation. As a more specific example, if an initial pool contains 365 units of a digital asset plus an amount required for each transaction fee (e.g., enough for one transaction per day for a year), the termination condition could verify that the number of units remaining is more than is required to complete the transaction; e.g., as long as there are enough funds, then continue to validate the transaction. Otherwise, if there are insufficient funds, then the termination condition is fulfilled and validation halts. Thus, if there are insufficient funds on day 366, validating that the locking script of the 366$^{th}$ unlocking transaction is needless and the termination condition ensures that it terminates the self-replication of the locking script.

Figure 22:
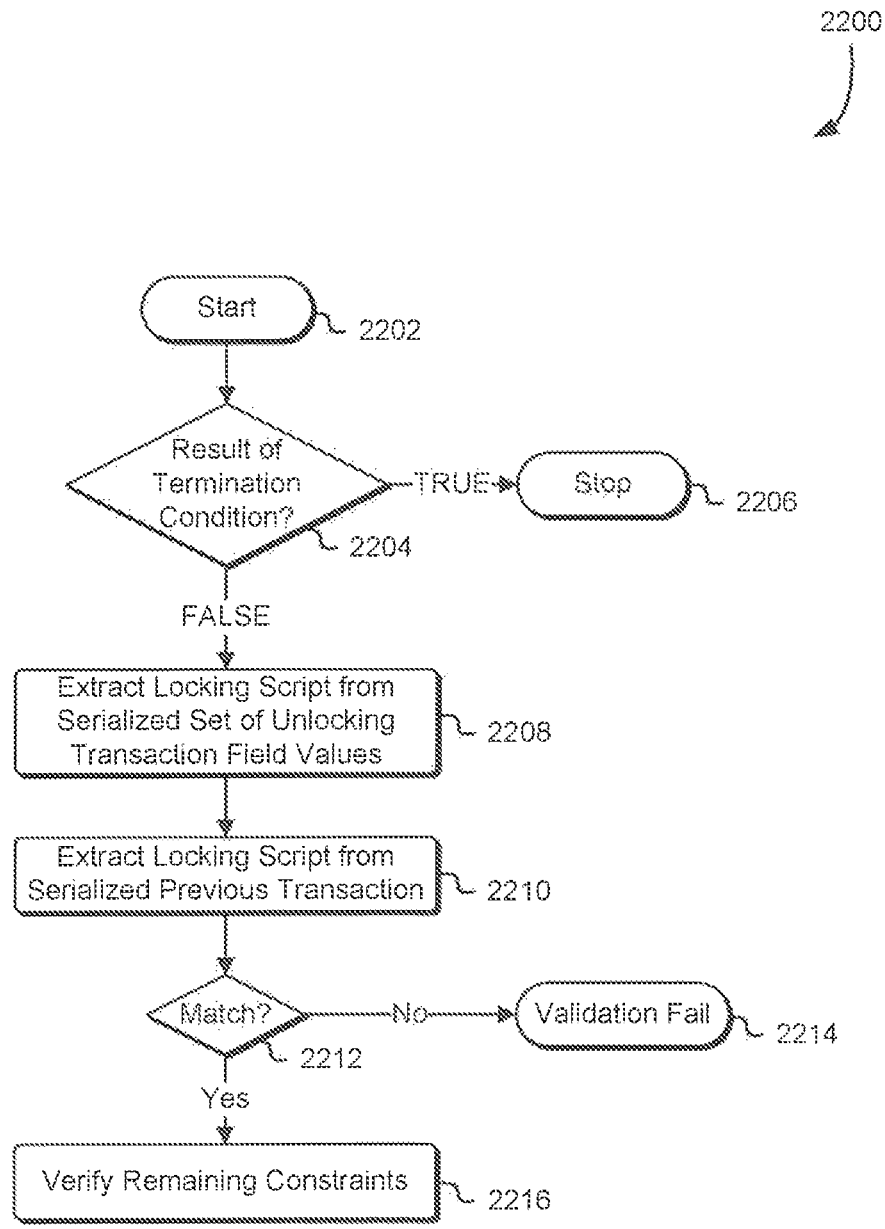
FIG. 22 is a flowchart that illustrates an example of a self-replicating smart contract with a termination condition in accordance with an embodiment.

FIG. 22 is a flowchart illustrating an example of a process 2200 for a self-replicating smart contract with a termination condition in accordance with various embodiments. Some or all of the process 2200 (or any other processes described, or variations and/or combinations of those processes) can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media).

For example, some or all of process 2200 can be performed by a validation node in a blockchain network, such as the example blockchain network 100 of FIG. 1. Such a validation node may be comprised of any suitable computing device (e.g., by a server in a data centre, by a client computing device, by multiple computing devices in a distributed system of a computing resource service provider, or by any suitable electronic client device such as the computing device 2600 of FIG. 26). The process 2200 includes a series of operations wherein if a termination condition is not met, the locking scripts of the unlocking transaction and the previous transaction are verified to be the same, and other constraints are verified.

In 2202, the system receives an unvalidated transaction. The system begins by running the unlocking script of the unvalidated transaction and then begins execution of the locking script of the previous (validated) transaction associated with the digital asset referenced by the unvalidated transaction. The process 2200 is depicted as executing a variation of the example scripts of Table 11. For example, in 2204, the system performing the process 2200 determines whether a termination condition is fulfilled. As noted above, in an implementation, the termination condition could be fulfilled if there is an insufficient amount of a digital asset to complete the transaction. It is contemplated, however, that other termination conditions are possible. For example, a termination condition could be time-based; the termination condition could be fulfilled if the unvalidated transaction is not validated prior to a particular date.

Upon fulfillment of the termination condition, in 2206, the process 2200 terminates and validation ends. Otherwise, in 2208, the system extracts a first locking script from the unvalidated transaction. Note that the first locking script is the locking script that will execute after the present unvalidated transaction is validated at such time that another unvalidated transaction attempts to transfer the UTXO of the present transaction.

In 2210, the system extracts a second locking script from a serialized previous transaction. In this embodiment, the second locking script is a copy of the locking script currently being executed. In 2212, the system performing the process 2200 determines whether the first locking script matches the second locking script (e.g., whether the two locking scripts are identical). If the locking scripts do not match, in 2214, the system determines that the unvalidated transaction has failed the validation and remains unvalidated.

Otherwise, in 2216, the system verifies any remaining constraints in the script (e.g., validates a digital signature or other requirement of the previous transaction). If there are no remaining constraints, or if all remaining constraints are successfully validated, then the transaction is successfully validated. After successful validation, the transaction may be added to a blockchain. Note that one or more of the operations performed in 2202-16 may be performed in various orders and combinations, including in parallel.

Figure 23:
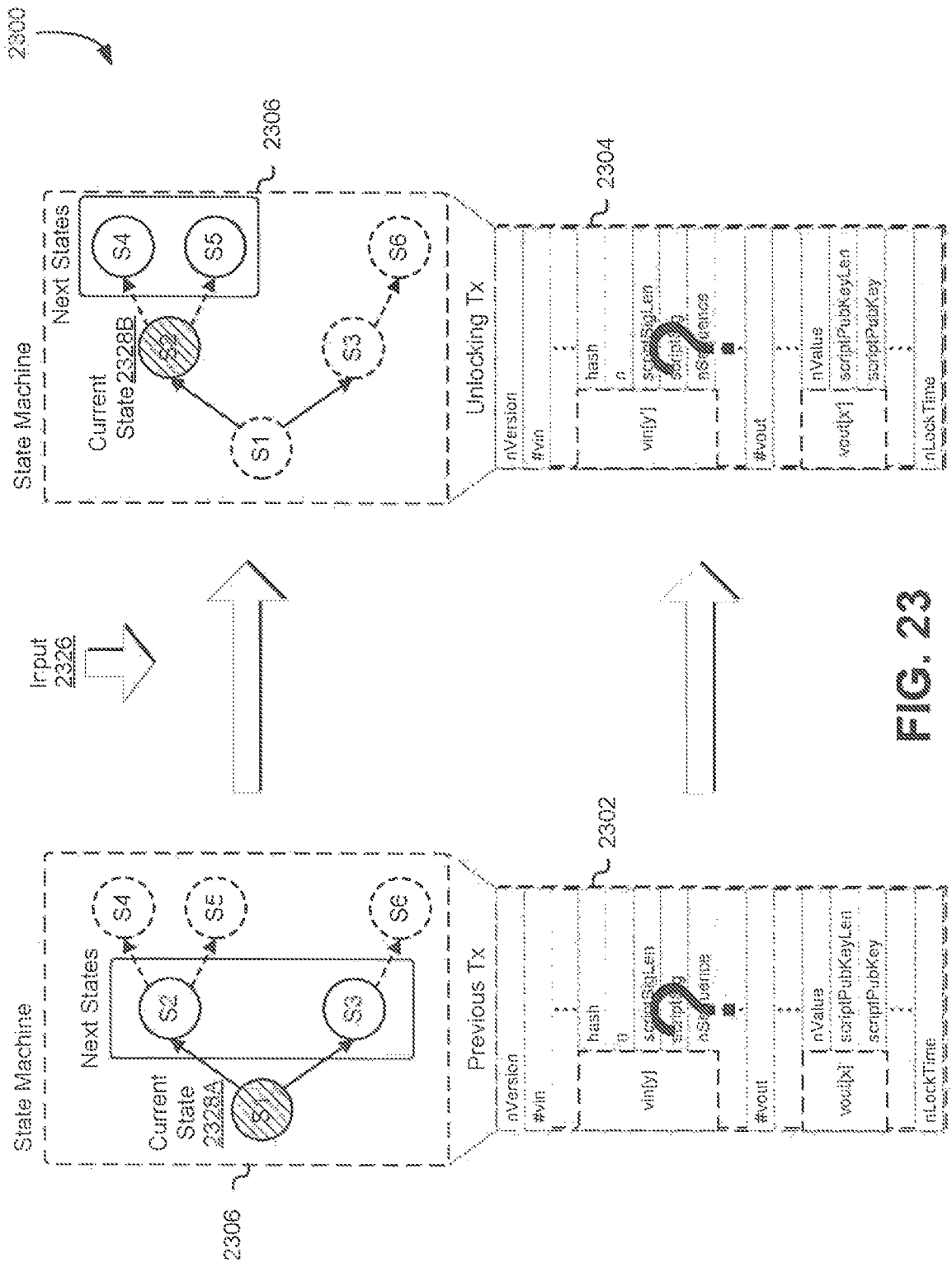
FIG. 23 illustrates an example of a problem with next state determination that is solved in accordance with an embodiment.

FIG. 23 illustrates an example 2300 of a problem solved by an embodiment of the present disclosure. Specifically, FIG. 23 depicts a state machine transitioning from a first state to a second state using blockchain transactions. In some examples, a state transition of a state machine is explained as, given a current state, one or more inputs 2326, and a set of state rules 2306, determine a next state. The example 2300 of FIG. 23 illustrates a previous transaction 2302 with a set of state rules 2306 and a first state 2328A embedded in a parameter. In some embodiments, the unlocking transaction 2304 is created to accept input 2326 from a determined source. The input 2326, in combination with the first state 2328A, is usable to determine, with reference to the set of state rules 2306, a second state 2328B embedded in a parameter of the unlocking transaction 2304.

In embodiments, the set of state rules is a state-transaction matrix that can be represented by a constraint on an unlocking transaction 2304 in the manner as described in conjunction with FIGS. 16 and 17. In such embodiments, the constraint is parameterized by the current state and the input from which the next state is determined. The constraint includes checks to ensure that the unlocking transaction 2304 includes the next state value in a particular field.

In embodiments, the current state is represented as a parameter embedded in a transaction, and the unlocking transaction 2304 will have the next state value also embedded in the unlocking transaction 2304. The next state value is the current state relative to the smart contract inside a set of field values of the unlocking transaction 2304, which as noted above, is accessible when the unlocking transaction 2304 is created. In some embodiments, at least one input is provided as external data in a parameter that is determined at the time the unlocking transaction 2304 is created. In order to be secure, such parameters come from a determined source. This provides a deterministic state transition. Finally, by employing the scripts of the self-replicating smart contract described above in conjunction with FIGS. 18-22, an embodiment of a trustless, deterministic state machine is created. In some examples, "trustless" refers to the property that any entity can create a valid unlocking transaction as long as the constraints are met; however, in some cases the entity may need to interact with the determined source to obtain required inputs. Note that although various embodiments described in conjunction with FIGS. 23-25 refer to obtaining inputs from determined sources, it is contemplated that in some embodiments one or more input can be obtained from an undetermined source, such as from a serialized previous transaction.

Figure 24:
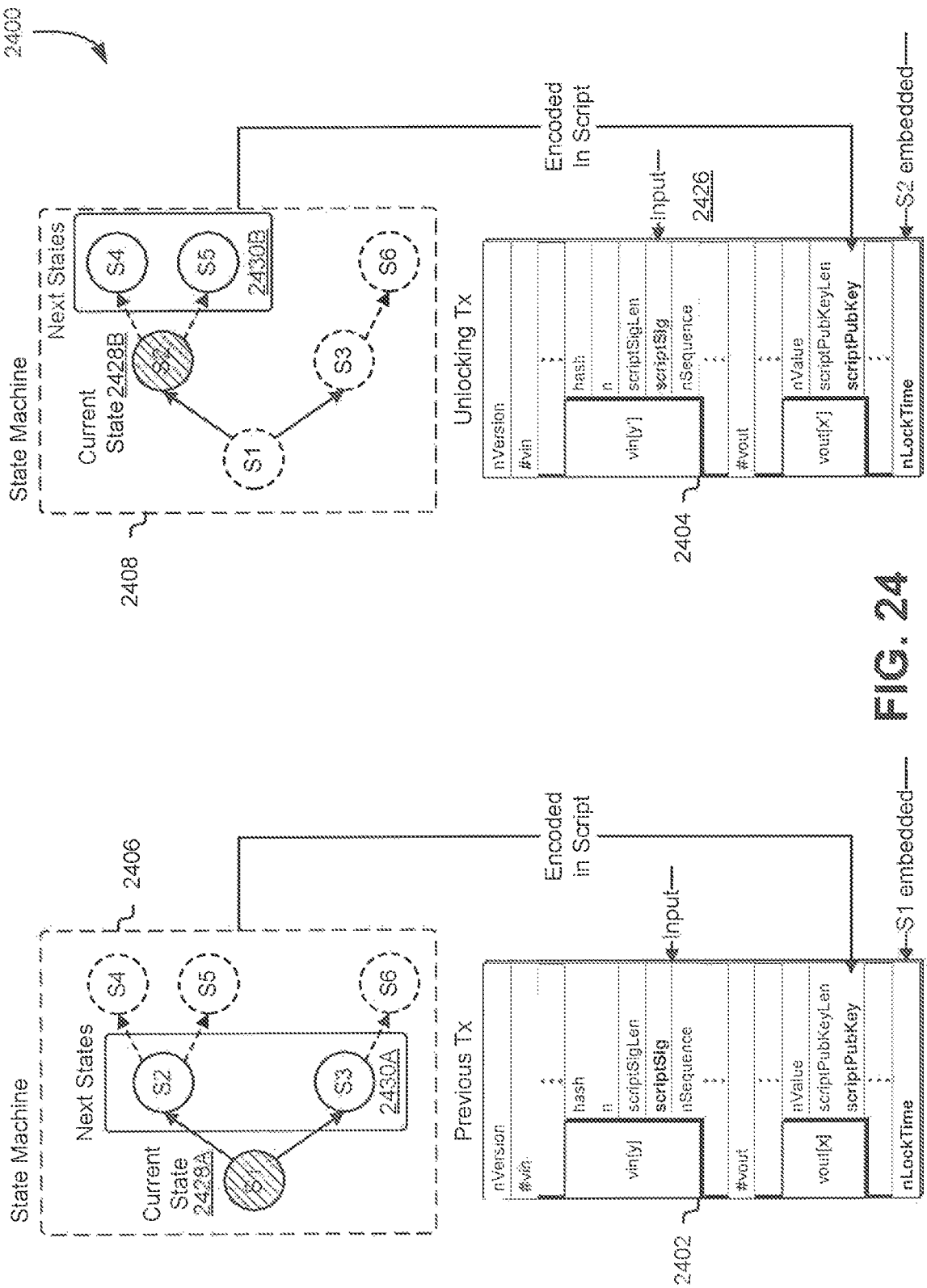
FIG. 24 illustrates an example of a trustless, deterministic state machine in accordance with an embodiment.

FIG. 24 illustrates an example 2400 of a trustless deterministic state machine of an embodiment of the present disclosure. As illustrated in FIG. 24, the example 2400 may include a previous transaction 2402 at a first state 2428A ("S1") in the set of state rules 2406. In the example 2400, the set of state rules 2406 offers two possible states 2430A ("S2" or "S3") for a next state. As can be seen in the example 2400, an unlocking transaction 2404, taking, as input, the input 2426 in its unlocking script and the first state 2428A ("S1") embedded in the set of field values of the previous transaction 2402, determines the appropriate second state 2428B ("S2") from the set of state rules 2406. As further can be seen in the example 2400, the states-transition matrix now provides new states 2430B ("S4" or "S5") that are possible for a next state transition from the second state 2428B. Note that the set of state rules 2406 may be coded as a switch statement or other conditional statement (e.g., "if-then-else") parameterized by the current state and one or more inputs.

In embodiments, each possible state is represented in a set of rules for state changes, such as a state-transition matrix, in the self-replicating locking script, and a particular transaction represents the state machine in a particular state. In such embodiments, the locking script of a transaction is duplicated to every unlocking transaction that attempts to transfer control of the digital asset to a next transaction, which must be linked to the current transaction. This process replicates until the termination condition is fulfilled. Because the inputs are not fixed and can be undetermined data, the state of the state machine can be made to change based on the particular external inputs. Thus, the undetermined data provides the input that can affect the next state.

In an illustrative example, Alice loans Bob some money and Bob agrees to pay Alice back. A trustless, deterministic state machine, as described in the present disclosure, can be implemented as a smart contract to represent the transfers that Bob makes to Alice. For example, the smart contract could be constructed such that Bob makes a payment to Alice every month for the next three months, and, if a payment is missed, Bob's debt goes into debt collection phase. Thus, as long as Bob makes his monthly transfer, the current state remains in repayment state. However, an external entity provides input that indicates that Bob has missed a transfer, then the state branches to missed transfer state. In the missed transfer state, Alice can release the transaction and turn it over to a debt collector, whereupon the trustless deterministic state machine switches to a debt collection state. In the debt collection state, the debt collector will collect the debt from Bob. Such a smart contract can be created using variations on the scripts of the embodiments depicted in FIGS. 23-25.

In another example, Alice is a very charitable person who is giving away 1 unit of a digital asset every month. Her rules are that anyone can claim the digital asset, but only 1 unit can be claimed per month. Alice creates a smart contract in the manner described in the present disclosure and seeds it with an initial pool of 3 units of the digital asset. Alice can construct a script that allows any entity to take 1 unit of the digital asset per month. The remaining portion of the digital asset is replicated to the succeeding smart contract. The following table illustrates an example of unlocking and locking scripts that implement a trustless deterministic state machine of the present disclosure.

TABLE 12

| Unlocking Script | Locking Script |
| --- | --- |
| <External Sig'><External Data><br><Serialized Previous Serialized Tx><br><SIGHASH Type><br><Serialized Set of Unlocking Tx Fields> | <Script to Check Termination Condition><br>// If not terminated<br>OP_NOTIF<br>  // Check Self-replicating Smart contract<br>  // Extract Locking Script from Unlocking Transaction<br>  <Script to Extract Locking Script><br>  // Extract Locking Script from Previous Transaction<br>  <Script to Extract Locking Script><br>  // Check the Locking Scripts are the same<br>  OP_EQUALVERIFY<br>  // Extract Current State<br>  <Script to Extract Data from Serialized Previous Tx><br>  // Read Input<br>  <Script to Read Input from unlocking script><br>  // Verify State-transition matrix constraint<br>  <Script to Determine State Transition><br>  <Script to Verify Constraint on Unlocking Tx><br>  OP_VERIFY<br>OP_ENDIF<br>// Check that Previous Tx, SIGHASH Type, and Unlocking Tx have been injected<br>OP_SELFTXINJECTION |

Figure 25:
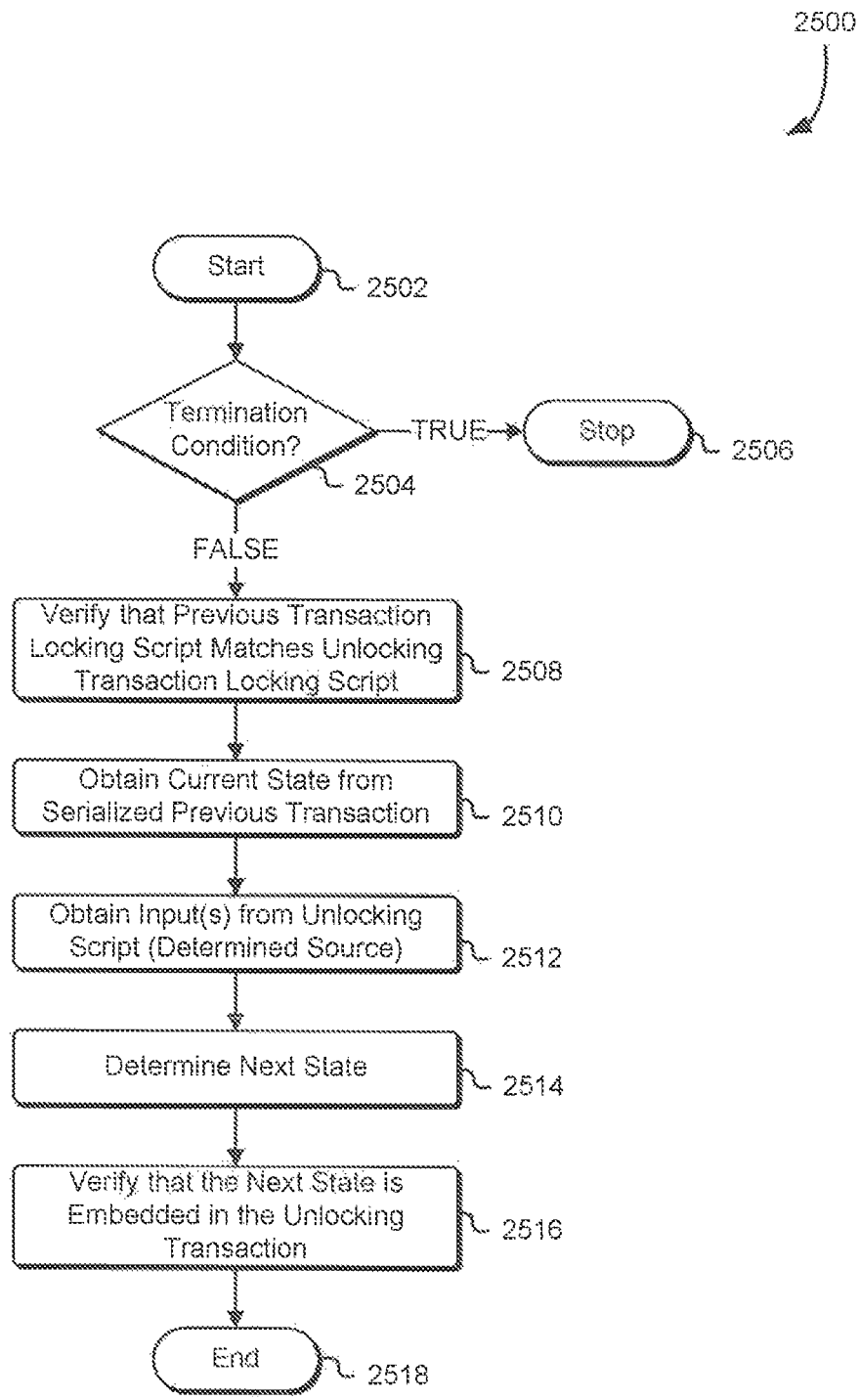
FIG. 25 is a flowchart that illustrates an example of a trustless, deterministic state machine in accordance with an embodiment.

FIG. 25 is a flowchart illustrating an example of a process 2500 for a trustless, deterministic state machine in accordance with various embodiments. Some or all of the process 2500 (or any other processes described, or variations and/or combinations of those processes) can be performed under the control of one or more computer systems configured with executable instructions and/or other data, and can be implemented as executable instructions executing collectively on one or more processors. The executable instructions and/or other data can be stored on a non-transitory, computer-readable storage medium (e.g., a computer program persistently stored on magnetic, optical, or flash media).

For example, some or all of process 2500 can be performed by a validation node in a example blockchain network, such as the example blockchain network 100 of FIG. 1. Such a validation node may be comprised of any suitable computing device (e.g., by a server in a data centre, by a client computing device, by multiple computing devices in a distributed system of a computing resource service provider, or by any suitable electronic client device such as the computing device 2600 of FIG. 26). The process 2500 includes a series of operations wherein locking scripts of a self-replicating smart contract are verified, a current state is obtained from a serialized previous transaction, inputs are obtained from an unlocking script, and a next state is determined based at least in part on a set of state rules. The process 2500 reflects a variation of the example scripts found of Table 12.

In 2502, the system receives an unlocking transaction. The system begins by running the unlocking script of the unlocking transaction, which causes the serialized previous transaction and inputs embedded in the locking script to be placed in the stack. These inputs are retrieved in 2512. In 2504, system performing the process 2500 determines whether a termination condition is fulfilled. The termination condition may be a termination condition as described in conjunction with FIGS. 19-22. In embodiments, the termination condition is a condition, which upon fulfillment, causes the state-machine transitions to end. If the termination condition is fulfilled, the system performing the process 2500 proceeds to 2506, whereupon the trustless, deterministic state machine ceases self-replication.

In 2508, the system verifies that the previous transaction locking script matches the unlocking transaction locking script in the manner described in 2212 of FIG. 22. If the locking scripts are not a match, validation fails and the unlocking transaction is not validated. Otherwise, if the locking scripts match, in 2510 the system extracts the current state of a set of possible states from the serialized previous transaction. In 2512, the system obtains the input or inputs placed on the stack as a result of execution of the locking script. Then, in 2514, the system applies the set of state rules to determine, based on the current state and the input or inputs, the next state of the set of possible states for the trustless, deterministic state machine. In 2516, the system verifies that the next state (e.g., a state variable and other state-related data, if applicable) is embedded in the unlocking transaction. The system may also apply any remaining constraints, as specified in the locking script. After successful completion of the operations of 2502-16, the process ends with 2500, whereupon the unlocking transaction can be considered valid by the system performing the process. Note that one or more of the operations performed in 2502-18 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 26 is an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 26, the computing device 2600 may include one or more processors 2602 that may be configured to communicate with, and are operatively coupled to, a number of peripheral subsystems via a bus subsystem 2604. The processors 2602 may be utilized for the traversal of decision trees in a random forest of supervised models in embodiments of the present disclosure (e.g., cause the evaluation of inverse document frequencies of various search terms, etc.). These peripheral subsystems may include a storage subsystem 2606, comprising a memory subsystem 2608 and a file/disk storage subsystem 2610, one or more user interface input devices 2612, one or more user interface output devices 2614, and a network interface subsystem 2616. Such storage subsystem 2606 may be used for temporary or long-term storage of information such as details associated with transactions described in the present disclosure, databases of historical records described in the present disclosure, and storage of decision rules of the supervised models in the present disclosure).

The bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses. The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a wireless network such that the data technician may be able to transmit and receive data while in a remote location, such as a user data centre. The bus subsystem 2604 may be utilized for communicating data such as details, search terms, and so on to the supervised model of the present disclosure, and may be utilized for communicating the output of the supervised model to the one or more processors 2602 and to merchants and/or creditors via the network interface subsystem 2616.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600. The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. The storage subsystem 2606 may comprise a memory subsystem 2608 and a file/disk storage subsystem 2610.

The memory subsystem 2608 may include a number of memories, including a main random access memory (RAM) 2618 for storage of instructions and data during program execution and a read only memory (ROM) 2620 in which fixed instructions may be stored.

The file/disk storage subsystem 2610 may provide a non-transitory persistent (non-volatile) storage for program and data files and may include a hard disk drive, a floppy disk drive along with associated removable media, a Compact Disk Read Only Memory (CD-ROM) drive, an optical drive, removable media cartridges, and other like storage media.

The computing device 2600 may include at least one local clock 2624. The local clock 2624 may be a counter that represents the number of ticks that have transpired from a particular starting date and may be located integrally within the computing device 2600. The local clock 2624 may be used to synchronize data transfers in the processors for the computing device 2600 and all of the subsystems included therein at specific clock pulses and may be used to coordinate synchronous operations between the computing device 2600 and other systems in a data centre. In one embodiment, the local clock 2624 is an atomic clock. In another embodiment, the local clock is a programmable interval timer.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 26 is intended only as a specific example for purposes of illustrating the preferred embodiment of the device. Many other configurations having more or fewer components than the system depicted in FIG. 26 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention, as defined by the appended claims. In the claims, any reference signs placed in parentheses shall not be construed as limiting the claims. The words "comprising", "comprises", and the like do not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method comprising:
   receiving, at a node in a blockchain network, a first transaction to validate, the first transaction including a first script that, as a result of being executed, causes the node to at least obtain data and a first set of field values of the first transaction;
   obtaining a second transaction, the second transaction including a second script that, as a result of being executed, causes the node to at least:
      determine, based at least in part on the data supplied as a result of execution of the first script, a set of constraints; and
      verify, based at least in part on the first set of field values, the set of constraints against the first transaction; and
   validating the first transaction according to the set of constraints as a result of execution of the first script and the second script.

2. The method claimed in claim 1, wherein validating the first transaction is performed without verifying that an entity that created the first transaction has access to secret information.

3. The method claimed in claim 1, wherein an identity of a source of the data unconstrained by the second script.

4. The method claimed in claim 1, wherein the second script constrains an identity of a source of the data.

5. The method claimed in claim 1, wherein the second script includes a public key of a particular data source usable to validate the data.

6. The method claimed in claim 5, wherein validating the data includes:
   generating, based at least in part on the public key and the data, a modified public key; and
   determining that the data is associated with a data source based at least in part on the modified public key.

7. The method claimed in claim 1, wherein the set of constraints are derived at least in part from a set of parameters in the data.

8. The method claimed in claim 1, wherein fulfilment of the set of constraints is a condition for reassociating of at least a portion of a digital asset.

9. The method claimed in claim 8, wherein validating the first transaction includes reassociating the digital asset from a first entity to a second entity.

10. The method claimed in claim 9, wherein an identity of the second entity is determined based at least in part on the set of constraints.

11. The method claimed in claim 1, wherein:
   a source of the data is a third transaction; and
   execution of the second script further causes the node to verify that the third transaction is associated with the first set of field values.

12. The method claimed in claim 1, wherein:
   a source of the data is the second transaction;
   the data includes a second set of field values of the second transaction; and
   execution of the second script causes the set of constraints to be derived at least in part from the second set of field values.

13. The method claimed in claim 1, wherein the set of constraints further cause at least a portion of a digital asset to be reassociated with a third entity.

14. A system, comprising:
   a processor; and
   memory including executable instructions that, as a result of execution by the processor, causes the system to perform the method of claim 1.

15. A non-transitory computer-readable storage medium having stored thereon executable instructions that, as a result of being executed by a processor of a computer system, cause the computer system to at least perform the method of claim 1.

* * * * *